United States Patent
Koh et al.

(10) Patent No.: US 12,528,608 B1
(45) Date of Patent: Jan. 20, 2026

(54) DOCKING STATIONS FOR SAFELY CHARGING AERIAL VEHICLES

(71) Applicant: Amazon Technologies, Inc., Seattle, WA (US)

(72) Inventors: Hong-Bin Koh, New Taipei (TW); Oleksii Krasnoshchok, Gdynia (PL); Chia-Wei Chan, New Taipei (TW); Ko Hsin Tsai, New Taipei (TW)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/608,579

(22) Filed: Mar. 18, 2024

(51) Int. Cl.
*B64U 80/25* (2023.01)
*B64U 70/92* (2023.01)
*B64U 70/97* (2023.01)
*B64U 10/14* (2023.01)

(52) U.S. Cl.
CPC ............. *B64U 80/25* (2023.01); *B64U 70/92* (2023.01); *B64U 70/97* (2023.01); *B64U 10/14* (2023.01)

(58) Field of Classification Search
CPC ........ B64U 80/25; B64U 70/92; B64U 70/97; B64U 10/14
See application file for complete search history.

(56) References Cited

U.S. PATENT DOCUMENTS 3,417,729 A * 12/1968 Gilday .................. B64C 27/006
416/61
3,575,527 A * 4/1971 Watanabe ............. F04D 29/052
416/169 R (Continued)

FOREIGN PATENT DOCUMENTS

CN 101385059 A 3/2009
CN 103224026 A 7/2013
(Continued)

OTHER PUBLICATIONS

GeoSLAM 1, "GeoSLAM, Solutions, ZEB Horizon," www.geoslam.com, GeoSLAM, Dec. 10, 2022, URL: https://web.archive.org/web/20221210081200/https://geoslam.com/solutions/zeb-horizon/ (Year: 2022), 1 page.
Jiang, Ziwen. "An autonomous landing and charging system for drones." PhD diss., Massachusetts Institute of Technology, 2018, 71 pages.

(Continued)

*Primary Examiner* — Medhat Badawi
(74) *Attorney, Agent, or Firm* — Athorus, PLLC

(57) ABSTRACT

A docking station includes a housing for accommodating an aerial vehicle, a charging contact for transferring electrical power to the aerial vehicle within the housing, and a sensor trigger for initiating or terminating the charging of the aerial vehicle. The sensor trigger includes an insertable element having an upper platform biased into contact with a surface of the housing and a blade-like extension that descends below the surface, as well as a sensor, such as a photointerrupter module, for determining positions of the blade-like extension. When an aerial vehicle is docked within the charging station, the aerial vehicle depresses the insertable element into the housing and causes a change in state of the sensor trigger, thereby energizing the charging contact, and transferring electrical power to the aerial vehicle. When the aerial vehicle departs the docking station, the state of the sensor trigger is restored, and the charging contact is deenergized.

20 Claims, 17 Drawing Sheets

(56) References Cited

U.S. PATENT DOCUMENTS

| | | | | |
|---|---|---|---|---|
| 3,805,723 A * | 4/1974 | Bernaerts | B63H 3/002 | 416/61 |
| 4,865,248 A * | 9/1989 | Barth | E05B 35/086 | 312/215 |
| 4,954,962 A * | 9/1990 | Evans, Jr. | G05D 1/0246 | 701/28 |
| 5,040,116 A * | 8/1991 | Evans, Jr. | G05D 1/0246 | 701/28 |
| 5,283,739 A * | 2/1994 | Summerville | G05D 1/0289 | 700/255 |
| 5,371,581 A * | 12/1994 | Wangler | G01S 17/933 | 340/963 |
| 5,386,462 A * | 1/1995 | Schlamp | G07F 11/62 | 379/93.12 |
| 5,452,374 A * | 9/1995 | Cullen | G06T 7/70 | 382/296 |
| 5,497,236 A * | 3/1996 | Wolff | H04N 1/047 | 358/406 |
| 5,731,884 A * | 3/1998 | Inoue | H04N 1/4076 | 358/3.06 |
| 5,847,522 A * | 12/1998 | Barba | H02K 7/1025 | 318/269 |
| 5,901,253 A * | 5/1999 | Tretter | G06T 3/606 | 382/292 |
| 5,995,898 A * | 11/1999 | Tuttle | G07C 5/085 | 427/255.31 |
| 6,031,612 A * | 2/2000 | Shirley | G01B 11/2531 | 356/511 |
| 6,266,577 B1 * | 7/2001 | Popp | B25J 9/1682 | 700/248 |
| 6,344,796 B1 * | 2/2002 | Ogilvie | G07C 9/27 | 340/568.1 |
| 6,374,155 B1 * | 4/2002 | Wallach | G05D 1/0295 | 701/25 |
| 6,426,699 B1 * | 7/2002 | Porter | A47F 10/00 | 340/568.1 |
| 6,507,670 B1 * | 1/2003 | Moed | G06T 5/77 | 382/172 |
| 6,543,983 B1 * | 4/2003 | Felder | B23Q 7/1442 | 414/389 |
| 6,636,781 B1 * | 10/2003 | Shen | B25J 9/065 | 703/2 |
| 6,676,460 B1 * | 1/2004 | Motsenbocker | B63H 5/165 | 440/71 |
| 6,690,997 B2 * | 2/2004 | Rivalto | G06Q 10/0835 | 700/242 |
| 6,694,217 B2 * | 2/2004 | Bloom | G07C 9/21 | 700/242 |
| 6,705,523 B1 * | 3/2004 | Stamm | G06Q 10/08 | 235/383 |
| 6,804,607 B1 * | 10/2004 | Wood | G05D 1/1062 | 340/425.5 |
| 6,919,803 B2 * | 7/2005 | Breed | G08B 29/181 | 340/568.1 |
| 6,954,290 B1 * | 10/2005 | Braudaway | H04N 1/00045 | 358/488 |
| 6,961,711 B1 * | 11/2005 | Chee | G07F 7/00 | 705/26.1 |
| 6,965,440 B1 * | 11/2005 | Nakagiri | G06F 3/1262 | 715/251 |
| 6,970,838 B1 * | 11/2005 | Kamath | G06Q 30/0617 | 705/26.81 |
| 7,006,952 B1 * | 2/2006 | Matsumoto | G06F 7/60 | 703/2 |
| 7,016,536 B1 * | 3/2006 | Ling | G06V 30/15 | 382/290 |
| 7,031,519 B2 * | 4/2006 | Elmenhurst | G06F 18/254 | 382/101 |
| 7,129,817 B2 * | 10/2006 | Yamagishi | G07C 9/37 | 340/5.71 |
| 7,133,743 B2 * | 11/2006 | Tilles | G07F 17/13 | 700/242 |
| 7,145,699 B2 * | 12/2006 | Dolan | G06V 30/1478 | 358/452 |
| 7,149,611 B2 * | 12/2006 | Beck | B64U 30/26 | 701/32.4 |
| 7,171,879 B2 * | 2/2007 | Gass | B27G 21/00 | 83/477.1 |
| 7,188,513 B2 * | 3/2007 | Wilson | G01N 1/2226 | 73/864.81 |
| 7,335,071 B1 * | 2/2008 | Motsenbocker | B63H 23/30 | 440/71 |
| 7,337,686 B2 * | 3/2008 | Sagi-Dolev | G01V 11/00 | 73/866 |
| 7,337,944 B2 * | 3/2008 | Devar | A47G 29/16 | 232/19 |
| 7,339,993 B1 * | 3/2008 | Brooks | H04N 21/440281 | 375/240.1 |
| 7,459,880 B1 * | 12/2008 | Rosen | H01M 10/465 | 320/101 |
| 7,639,386 B1 * | 12/2009 | Siegel | G06Q 40/03 | 358/1.18 |
| 7,668,404 B2 * | 2/2010 | Adams | G06V 10/24 | 382/101 |
| 7,673,831 B2 * | 3/2010 | Steele | F42B 12/365 | 244/1 TD |
| 7,685,953 B2 * | 3/2010 | Giles | B63J 99/00 | 114/72 |
| 7,693,745 B1 * | 4/2010 | Pomerantz | G07F 17/13 | 705/26.5 |
| 7,894,939 B2 * | 2/2011 | Zini | G05D 1/028 | 700/245 |
| 7,925,375 B2 * | 4/2011 | Schininger | G07F 11/54 | 700/214 |
| 7,946,526 B2 * | 5/2011 | Zimet | B64U 30/24 | 244/17.23 |
| 7,946,530 B1 * | 5/2011 | Talmage, Jr. | B64C 27/006 | 244/140 |
| 7,966,093 B2 * | 6/2011 | Zhuk | G05D 1/0088 | 706/50 |
| 8,015,023 B1 * | 9/2011 | Lee | G06Q 10/08 | 700/226 |
| 8,078,317 B2 * | 12/2011 | Allinson | G07F 11/62 | 700/242 |
| 8,126,642 B2 * | 2/2012 | Trepagnier | G05D 1/024 | 701/28 |
| 8,131,607 B2 * | 3/2012 | Park | G06Q 10/047 | 705/28 |
| 8,145,351 B2 * | 3/2012 | Schininger | G07F 9/009 | 221/12 |
| 8,195,328 B2 * | 6/2012 | Mallett | G16H 40/67 | 221/102 |
| 8,286,236 B2 * | 10/2012 | Jung | G06Q 50/18 | 713/168 |
| 8,412,588 B1 * | 4/2013 | Bodell | G06Q 30/0643 | 706/919 |
| 8,418,959 B2 * | 4/2013 | Kang | B64U 80/25 | 244/116 |
| 8,429,754 B2 * | 4/2013 | Jung | H04L 9/40 | 726/21 |
| 8,473,189 B2 | 6/2013 | Christoph | | |
| 8,511,606 B1 * | 8/2013 | Lutke | B64U 80/40 | 320/109 |
| 8,577,538 B2 | 11/2013 | Lenser et al. | | |
| 8,599,027 B2 * | 12/2013 | Sanchez | G01S 13/931 | 340/435 |
| 8,602,349 B2 * | 12/2013 | Petrov | G05D 1/0866 | 244/17.23 |
| 8,639,400 B1 * | 1/2014 | Wong | A63H 27/12 | 701/16 |
| 8,736,820 B2 * | 5/2014 | Choe | G05D 1/024 | 356/9 |
| 8,752,166 B2 * | 6/2014 | Jung | B33Y 50/02 | 700/95 |
| 8,791,790 B2 * | 7/2014 | Robertson | G07C 9/20 | 455/411 |
| 8,874,301 B1 * | 10/2014 | Rao | B60K 28/04 | 340/576 |

(56) References Cited

U.S. PATENT DOCUMENTS

| | | | | |
|---|---|---|---|---|
| 8,899,903 B1* | 12/2014 | Saad | | B65G 67/00 320/109 |
| 8,948,914 B2* | 2/2015 | Zini | | G05B 19/41895 700/258 |
| 8,956,100 B2* | 2/2015 | Davi | | B60P 1/02 414/334 |
| 8,989,053 B1* | 3/2015 | Skaaksrud | | H04W 4/80 370/255 |
| 9,033,285 B2* | 5/2015 | Iden | | B61C 17/12 701/19 |
| 9,051,043 B1* | 6/2015 | Peeters | | G05D 1/104 |
| 9,079,587 B1* | 7/2015 | Rupp | | G05D 1/0289 |
| 9,139,310 B1* | 9/2015 | Wang | | G05D 1/102 |
| 9,163,909 B2* | 10/2015 | Chengalva | | G05D 1/0088 |
| 9,193,452 B2* | 11/2015 | Carreker | | B64C 27/52 |
| 9,195,959 B1* | 11/2015 | Lopez | | G06Q 30/0635 |
| 9,216,587 B2* | 12/2015 | Ando | | B41J 29/38 |
| 9,216,857 B1* | 12/2015 | Kalyan | | G06Q 10/087 |
| 9,230,236 B2 | 1/2016 | Villamar | | |
| 9,235,213 B2* | 1/2016 | Villamar | | G06Q 10/087 |
| 9,244,147 B1* | 1/2016 | Soundararajan | | G06Q 10/0833 |
| 9,256,852 B1* | 2/2016 | Myllymaki | | B60P 3/007 |
| 9,261,578 B2* | 2/2016 | Im | | G01S 5/02526 |
| 9,321,531 B1* | 4/2016 | Takayama | | B64D 47/06 |
| 9,336,506 B2 | 5/2016 | Shucker et al. | | |
| 9,336,635 B2* | 5/2016 | Robertson | | G07C 9/00571 |
| 9,358,975 B1* | 6/2016 | Watts | | G05D 1/0223 |
| 9,373,149 B2 | 6/2016 | Abhyanker | | |
| 9,381,916 B1* | 7/2016 | Zhu | | B60W 30/0956 |
| 9,397,518 B1* | 7/2016 | Theobald | | B25J 5/005 |
| 9,404,761 B2* | 8/2016 | Meuleau | | G01C 21/3453 |
| 9,409,644 B2* | 8/2016 | Stanek | | G05D 1/0202 |
| 9,411,337 B1* | 8/2016 | Theobald | | G05D 1/0225 |
| 9,412,280 B1* | 8/2016 | Zwillinger | | G08G 5/54 |
| 9,436,183 B2* | 9/2016 | Thakur | | G01C 21/3407 |
| 9,436,926 B2* | 9/2016 | Cousins | | G05D 1/0246 |
| 9,448,559 B2* | 9/2016 | Kojo | | G01C 21/3685 |
| 9,489,490 B1* | 11/2016 | Theobald | | G16H 20/13 |
| 9,510,316 B2 | 11/2016 | Skaaksrud | | |
| 9,535,421 B1* | 1/2017 | Canoso | | G05D 1/0214 |
| 9,545,852 B2* | 1/2017 | Streett | | H02J 7/35 |
| 9,561,941 B1* | 2/2017 | Watts | | G05D 1/0268 |
| 9,563,201 B1* | 2/2017 | Tofte | | H04N 23/90 |
| 9,568,335 B2* | 2/2017 | Thakur | | G05D 1/0217 |
| 9,582,950 B2* | 2/2017 | Shimizu | | G07C 9/28 |
| 9,600,645 B2* | 3/2017 | Fadell | | H04L 67/12 |
| 9,619,776 B1* | 4/2017 | Ford | | B64U 80/86 |
| 9,623,553 B1 | 4/2017 | Theobald et al. | | |
| 9,623,562 B1* | 4/2017 | Watts | | B25J 13/006 |
| 9,650,136 B1* | 5/2017 | Haskin | | B64U 10/13 |
| 9,652,912 B2* | 5/2017 | Fadell | | G06Q 10/08 |
| 9,656,805 B1* | 5/2017 | Evans | | B64U 80/25 |
| 9,671,791 B1* | 6/2017 | Paczan | | G08G 5/57 |
| 9,677,564 B1* | 6/2017 | Woodworth | | B64U 20/30 |
| 9,682,481 B2 | 6/2017 | Lutz et al. | | |
| 9,697,730 B2* | 7/2017 | Thakur | | G08G 1/0112 |
| 9,718,564 B1* | 8/2017 | Beckman | | B61L 15/0027 |
| 9,720,414 B1* | 8/2017 | Theobald | | B25J 5/007 |
| 9,731,821 B2* | 8/2017 | Hoareau | | G06Q 10/08 |
| 9,733,646 B1* | 8/2017 | Nusser | | B65G 57/03 |
| 9,746,463 B1* | 8/2017 | Watts | | G01S 17/86 |
| 9,746,853 B2* | 8/2017 | Scheepjens | | G05D 1/0212 |
| 9,778,653 B1* | 10/2017 | McClintock | | G06Q 10/08 |
| 9,786,187 B1* | 10/2017 | Bar-Zeev | | G06Q 10/08355 |
| 9,796,529 B1* | 10/2017 | Hoareau | | G06Q 10/08 |
| 9,828,092 B1* | 11/2017 | Navot | | B64U 10/14 |
| 9,858,604 B2* | 1/2018 | Apsley | | G06Q 30/0635 |
| 9,886,035 B1* | 2/2018 | Watts | | G05D 1/0088 |
| 9,896,204 B1* | 2/2018 | Willison | | G05D 1/102 |
| 9,959,771 B1* | 5/2018 | Carlson | | G08G 5/57 |
| 9,959,773 B2 | 5/2018 | Raptopoulos et al. | | |
| 9,972,212 B1* | 5/2018 | Sperindeo | | G06T 7/90 |
| 9,974,612 B2* | 5/2018 | Pinter | | A61B 5/741 |
| 10,022,753 B2* | 7/2018 | Chelian | | B07C 5/362 |
| 10,022,867 B2 | 7/2018 | Saboo et al. | | |
| 10,048,697 B1* | 8/2018 | Theobald | | B65G 47/61 |
| 10,108,185 B1* | 10/2018 | Theobald | | G05B 19/4189 |
| 10,137,984 B1* | 11/2018 | Flick | | B64F 1/00 |
| 10,315,528 B1* | 6/2019 | Crawford, Jr. | | B60L 53/14 |
| 10,418,830 B1* | 9/2019 | Parodi | | H02J 7/0042 |
| 10,434,885 B2* | 10/2019 | Antonini | | B64C 25/52 |
| 10,558,226 B1* | 2/2020 | Bigdeli | | G06V 10/22 |
| 10,745,132 B1* | 8/2020 | Kimchi | | B64U 10/13 |
| 10,780,988 B2* | 9/2020 | Buchmueller | | B64U 50/19 |
| 10,858,097 B2* | 12/2020 | Waters | | B60L 53/36 |
| 10,860,115 B1* | 12/2020 | Tran | | G06F 3/0346 |
| 11,133,684 B1* | 9/2021 | Maurer | | B64U 80/25 |
| 11,164,149 B1* | 11/2021 | Williams | | G06K 19/06028 |
| 11,603,219 B2* | 3/2023 | Ratajczak | | B64U 30/20 |
| 11,619,952 B2* | 4/2023 | Kwon | | G05D 1/0808 701/3 |
| 11,628,932 B2* | 4/2023 | Seung | | B64U 60/50 244/17.23 |
| 11,649,050 B1* | 5/2023 | Miller | | G05D 1/0808 701/11 |
| 11,667,402 B2* | 6/2023 | Liske | | B64U 80/25 244/116 |
| 11,726,184 B2 | 8/2023 | Ferreira et al. | | |
| D999,675 S* | 9/2023 | Paterson | | D12/174 |
| 11,776,136 B1* | 10/2023 | Pachikov | | B64U 10/13 244/17.23 |
| 11,808,580 B1* | 11/2023 | Ebrahimi Afrouzi | | G05D 1/0272 |
| 11,820,507 B2* | 11/2023 | Raptopoulos | | B64F 1/22 |
| D1,008,873 S* | 12/2023 | Lin | | D12/16.1 |
| 11,840,329 B1* | 12/2023 | Hinman | | B64U 50/19 |
| 11,851,162 B1* | 12/2023 | Daube | | B64C 19/00 |
| 11,868,146 B2* | 1/2024 | Yasunaga | | G05D 1/0094 |
| 11,933,613 B2* | 3/2024 | Michini | | G05D 1/689 |
| 11,939,080 B2* | 3/2024 | Cowden | | B64U 80/30 |
| 11,987,402 B2* | 5/2024 | Howe | | B64U 70/30 |
| 11,993,409 B2* | 5/2024 | Howe | | B64U 70/70 |
| D1,046,685 S* | 10/2024 | Paterson | | D12/16.1 |
| D1,048,023 S* | 10/2024 | Paterson | | D14/434 |
| 12,116,143 B2* | 10/2024 | Howe | | B64U 30/299 |
| 12,131,656 B2* | 10/2024 | Raptopoulos | | G05D 1/695 |
| 12,168,533 B1* | 12/2024 | Hinman | | B64U 70/97 |
| 12,228,407 B2* | 2/2025 | Twining | | B64U 70/95 |
| D1,073,682 S* | 5/2025 | Koh | | D12/345 |
| 12,358,662 B2* | 7/2025 | Roberts | | B64U 80/25 |
| 12,405,617 B2* | 9/2025 | Tsai | | B64U 80/25 |
| 12,406,221 B2* | 9/2025 | Burch, V | | G01S 5/0018 |
| 2001/0045449 A1* | 11/2001 | Shannon | | G07C 9/21 232/19 |
| 2002/0016726 A1* | 2/2002 | Ross | | G06Q 10/08 705/339 |
| 2002/0035450 A1* | 3/2002 | Thackston | | G05B 19/4099 703/1 |
| 2002/0072979 A1* | 6/2002 | Sinha | | G06Q 10/087 705/26.7 |
| 2002/0087375 A1* | 7/2002 | Griffin | | G06Q 10/0835 705/336 |
| 2002/0107751 A1* | 8/2002 | Rajagopalan | | G06Q 30/0627 705/26.7 |
| 2002/0111914 A1* | 8/2002 | Terada | | G06Q 30/02 705/60 |
| 2002/0116289 A1* | 8/2002 | Yang | | G06Q 10/08 705/26.81 |
| 2002/0123930 A1* | 9/2002 | Boyd | | G06Q 30/0254 705/14.1 |
| 2002/0156645 A1* | 10/2002 | Hansen | | G07F 17/13 705/26.1 |
| 2003/0040980 A1* | 2/2003 | Nakajima | | G07F 17/13 705/26.8 |
| 2003/0072031 A1* | 4/2003 | Kuwata | | H04N 1/00188 358/1.15 |
| 2003/0121968 A1* | 7/2003 | Miller | | G07F 17/13 235/375 |
| 2003/0141411 A1* | 7/2003 | Pandya | | G06Q 10/02 244/114 R |

(56) References Cited

U.S. PATENT DOCUMENTS

| | | | | |
|---|---|---|---|---|
| 2004/0002898 A1* | 1/2004 | Kuhlmann | G06Q 30/0635 | 705/26.81 |
| 2004/0068416 A1* | 4/2004 | Solomon | G05D 1/0088 | 446/454 |
| 2004/0112660 A1* | 6/2004 | Johansson | B63B 27/19 | 180/167 |
| 2004/0160335 A1* | 8/2004 | Reitmeier | A47J 31/4407 | 340/4.12 |
| 2004/0162638 A1* | 8/2004 | Solomon | G05D 1/0088 | 700/247 |
| 2004/0257199 A1* | 12/2004 | Fitzgibbon | G07C 9/00182 | 340/5.71 |
| 2005/0068178 A1* | 3/2005 | Lee | G06Q 30/06 | 700/214 |
| 2005/0093865 A1* | 5/2005 | Jia | H04N 1/38 | 345/426 |
| 2005/0102240 A1* | 5/2005 | Misra | G06Q 30/06 | 705/59 |
| 2005/0244060 A1* | 11/2005 | Nagarajan | H04N 1/41 | 382/302 |
| 2005/0285934 A1* | 12/2005 | Carter | H04N 7/147 | 348/14.06 |
| 2006/0053534 A1* | 3/2006 | Mullen | F41H 7/005 | 2/456 |
| 2006/0118162 A1* | 6/2006 | Saelzer | H02J 3/38 | 136/246 |
| 2006/0136237 A1* | 6/2006 | Spiegel | G06Q 10/0835 | 705/13 |
| 2006/0287829 A1* | 12/2006 | Pashko-Paschenko | G08G 5/723 | 340/436 |
| 2007/0016496 A1* | 1/2007 | Bar | G06Q 10/087 | 705/28 |
| 2007/0073552 A1* | 3/2007 | Hileman | G06Q 10/08 | 705/333 |
| 2007/0102565 A1* | 5/2007 | Speer | B64U 10/20 | 244/2 |
| 2007/0150375 A1* | 6/2007 | Yang | G06Q 10/08 | 705/26.81 |
| 2007/0170237 A1* | 7/2007 | Neff | A47G 29/122 | 232/36 |
| 2007/0210953 A1* | 9/2007 | Abraham | G08G 5/57 | 342/36 |
| 2007/0228214 A1* | 10/2007 | Horak | B64U 80/10 | 244/63 |
| 2007/0233337 A1* | 10/2007 | Plishner | G05D 1/0295 | 701/23 |
| 2007/0244763 A1* | 10/2007 | Williams | G06Q 10/10 | 705/26.1 |
| 2007/0246601 A1* | 10/2007 | Layton | B64C 39/10 | 244/12.2 |
| 2007/0262195 A1* | 11/2007 | Bulaga | B64U 10/20 | 244/12.4 |
| 2007/0293978 A1* | 12/2007 | Wurman | G05B 19/4189 | 700/213 |
| 2008/0012697 A1* | 1/2008 | Smith | B60K 35/50 | 340/439 |
| 2008/0027591 A1* | 1/2008 | Lenser | G05D 1/0038 | 701/28 |
| 2008/0100258 A1* | 5/2008 | Ward | H01M 10/465 | 320/101 |
| 2008/0109246 A1* | 5/2008 | Russell | G06Q 10/04 | 414/800 |
| 2008/0111816 A1* | 5/2008 | Abraham | G06Q 30/06 | 345/420 |
| 2008/0141921 A1* | 6/2008 | Hinderks | F01L 3/22 | 114/274 |
| 2008/0150679 A1* | 6/2008 | Bloomfield | B60R 25/24 | 340/5.72 |
| 2008/0154659 A1* | 6/2008 | Bettes | G06Q 10/08 | 705/7.36 |
| 2008/0167817 A1* | 7/2008 | Hessler | G01C 21/005 | 701/514 |
| 2008/0184906 A1* | 8/2008 | Kejha | B64D 27/33 | 102/374 |
| 2008/0189012 A1* | 8/2008 | Kaufmann | B62D 15/025 | 701/41 |
| 2008/0301009 A1* | 12/2008 | Plaster | G06Q 10/087 | 705/28 |
| 2009/0027253 A1* | 1/2009 | van Tooren | G08G 5/59 | 342/29 |
| 2009/0062974 A1* | 3/2009 | Tamamoto | G05D 1/0295 | 701/25 |
| 2009/0063166 A1* | 3/2009 | Palmer | B65D 19/42 | 211/133.4 |
| 2009/0079388 A1* | 3/2009 | Reddy | G06Q 40/12 | 320/109 |
| 2009/0086275 A1* | 4/2009 | Liang | G06V 10/25 | 358/3.21 |
| 2009/0091435 A1* | 4/2009 | Bolourchi | B60K 28/066 | 340/575 |
| 2009/0106124 A1* | 4/2009 | Yang | G06Q 30/0601 | 705/26.1 |
| 2009/0149985 A1* | 6/2009 | Chirnomas | G07F 11/26 | 705/26.1 |
| 2009/0164379 A1* | 6/2009 | Jung | G06Q 10/06 | 705/310 |
| 2009/0165127 A1* | 6/2009 | Jung | G06Q 10/06 | 726/21 |
| 2009/0216394 A1* | 8/2009 | Heppe | B64U 20/87 | 701/16 |
| 2009/0236470 A1* | 9/2009 | Goossen | B64U 70/80 | 244/115 |
| 2009/0254457 A1* | 10/2009 | Folsom | G06Q 30/0601 | 705/26.1 |
| 2009/0254482 A1* | 10/2009 | Vadlamani | G06F 21/10 | 705/59 |
| 2009/0299903 A1* | 12/2009 | Hung | G06Q 20/40 | 235/462.11 |
| 2009/0303507 A1* | 12/2009 | Abeloe | B33Y 30/00 | 358/1.9 |
| 2009/0314883 A1* | 12/2009 | Arlton | B64U 80/40 | 244/63 |
| 2010/0007479 A1* | 1/2010 | Smith | B60W 50/14 | 340/576 |
| 2010/0030608 A1* | 2/2010 | Kaminsky | G06Q 10/10 | 707/E17.014 |
| 2010/0031351 A1* | 2/2010 | Jung | G06F 21/10 | 700/98 |
| 2010/0088163 A1* | 4/2010 | Davidson | G06Q 10/08 | 340/425.5 |
| 2010/0088175 A1* | 4/2010 | Lundquist | G06Q 30/0234 | 705/26.1 |
| 2010/0100269 A1* | 4/2010 | Ekhaguere | G08G 5/74 | 701/26 |
| 2010/0169185 A1* | 7/2010 | Cottingham | G06F 3/01 | 715/708 |
| 2010/0193626 A1* | 8/2010 | Goossen | B64U 80/10 | 244/2 |
| 2010/0206145 A1* | 8/2010 | Tetelbaum | B27G 19/02 | 83/13 |
| 2010/0287065 A1* | 11/2010 | Alivandi | G06Q 30/02 | 705/26.1 |
| 2010/0299067 A1* | 11/2010 | McCollough | G08G 5/51 | 701/301 |
| 2010/0299222 A1* | 11/2010 | Hamilton, IV | G06Q 20/12 | 705/26.1 |
| 2011/0024559 A1* | 2/2011 | McGeer | B64F 5/40 | 244/110 F |
| 2011/0035149 A1* | 2/2011 | McAndrew | G05D 1/0077 | 701/466 |
| 2011/0074570 A1* | 3/2011 | Feldstein | G08B 13/196 | 348/E7.087 |
| 2011/0087350 A1* | 4/2011 | Fogel | G06T 19/00 | 700/98 |
| 2011/0112761 A1* | 5/2011 | Hurley | G06Q 10/08 | 701/465 |

(56) References Cited

U.S. PATENT DOCUMENTS

| | | | |
|---|---|---|---|
| 2011/0153052 A1* | 6/2011 | Pettibone | G06F 30/13 700/98 |
| 2011/0166707 A1* | 7/2011 | Romanov | G01S 5/16 700/255 |
| 2011/0178711 A1* | 7/2011 | Christoph | G01S 7/51 701/301 |
| 2011/0210866 A1* | 9/2011 | David | G08G 1/166 340/901 |
| 2011/0227435 A1* | 9/2011 | Maeda | B60L 50/16 310/77 |
| 2011/0246331 A1* | 10/2011 | Luther | G06Q 30/0627 705/26.63 |
| 2011/0253831 A1* | 10/2011 | Cheng | A63H 27/12 244/17.11 |
| 2011/0264311 A1* | 10/2011 | Lee | H04N 7/183 348/E7.085 |
| 2011/0282476 A1* | 11/2011 | Hegemier | G06Q 30/0621 705/26.5 |
| 2011/0301787 A1* | 12/2011 | Chaperon | A63H 27/12 701/2 |
| 2011/0313878 A1* | 12/2011 | Norman | G06F 30/12 705/26.5 |
| 2012/0039694 A1* | 2/2012 | Suzanne | E04H 5/02 414/339 |
| 2012/0078592 A1* | 3/2012 | Sims, Jr. | G06F 30/00 703/1 |
| 2012/0091260 A1* | 4/2012 | Callou | G05D 1/0858 244/17.13 |
| 2012/0109419 A1* | 5/2012 | Mercado | G07C 9/00182 701/2 |
| 2012/0219397 A1* | 8/2012 | Baker | B65G 1/1373 414/796 |
| 2012/0221438 A1* | 8/2012 | Cook, Jr. | G06Q 30/0641 705/26.61 |
| 2012/0227389 A1* | 9/2012 | Hinderks | F02B 75/002 60/317 |
| 2012/0229325 A1* | 9/2012 | Dutruc | G01S 7/03 342/29 |
| 2012/0234969 A1* | 9/2012 | Savoye | B64U 10/13 244/17.11 |
| 2012/0235606 A1* | 9/2012 | Takeuchi | H02K 7/116 318/371 |
| 2012/0323365 A1* | 12/2012 | Taylor | G05D 1/0225 901/1 |
| 2013/0006739 A1* | 1/2013 | Horvitz | G06Q 30/0222 705/14.23 |
| 2013/0073477 A1* | 3/2013 | Grinberg | G06Q 30/00 705/332 |
| 2013/0081245 A1* | 4/2013 | Vavrina | B60L 53/51 29/281.1 |
| 2013/0093582 A1* | 4/2013 | Walsh | G08G 1/166 340/436 |
| 2013/0126611 A1* | 5/2013 | Kangas | G06K 7/10178 235/385 |
| 2013/0148123 A1* | 6/2013 | Hayashi | G03F 9/7046 356/401 |
| 2013/0193269 A1* | 8/2013 | Zwaan | B64U 20/87 244/118.1 |
| 2013/0206915 A1* | 8/2013 | Desaulniers | B64U 10/20 244/165 |
| 2013/0218446 A1* | 8/2013 | Bradley | G06Q 10/00 701/123 |
| 2013/0218799 A1* | 8/2013 | Lehmann | G06Q 10/063 705/337 |
| 2013/0261792 A1* | 10/2013 | Gupta | G05B 15/02 700/232 |
| 2013/0262251 A1 | 10/2013 | Wan et al. | |
| 2013/0262252 A1* | 10/2013 | Lakshman | G06Q 30/06 705/26.1 |
| 2013/0262276 A1* | 10/2013 | Wan | G06Q 10/00 705/28 |
| 2013/0262336 A1* | 10/2013 | Wan | G06Q 10/087 705/339 |
| 2013/0264381 A1* | 10/2013 | Kim | G07F 17/13 232/24 |
| 2013/0320133 A1* | 12/2013 | Ratti | B64C 33/025 244/22 |
| 2013/0324164 A1* | 12/2013 | Vulcano | H04W 4/02 455/457 |
| 2013/0332062 A1* | 12/2013 | Kreitmair-Steck | G08G 5/80 701/301 |
| 2014/0010656 A1* | 1/2014 | Nies | F03D 7/0244 29/889 |
| 2014/0022055 A1 | 1/2014 | Levien et al. | |
| 2014/0025230 A1* | 1/2014 | Levien | A63H 27/12 701/2 |
| 2014/0030444 A1* | 1/2014 | Swaminathan | C23C 16/48 427/569 |
| 2014/0031964 A1* | 1/2014 | Sidhu | G05B 19/41865 700/99 |
| 2014/0032034 A1* | 1/2014 | Raptopoulos | G08G 5/55 701/25 |
| 2014/0040065 A1* | 2/2014 | DuBois | G06Q 30/0621 705/26.5 |
| 2014/0052661 A1* | 2/2014 | Shakes | G06Q 10/0836 705/339 |
| 2014/0058959 A1* | 2/2014 | Isbjornssund | G06Q 50/184 705/310 |
| 2014/0081445 A1* | 3/2014 | Villamar | G06Q 10/087 701/19 |
| 2014/0089073 A1* | 3/2014 | Jacobs | G06Q 20/326 705/16 |
| 2014/0136282 A1* | 5/2014 | Fedele | G06Q 10/06 705/7.31 |
| 2014/0136414 A1* | 5/2014 | Abhyanker | G06Q 20/3224 701/25 |
| 2014/0149244 A1* | 5/2014 | Abhyanker | G06Q 30/0605 705/26.2 |
| 2014/0156053 A1* | 6/2014 | Mahdavi | B29C 64/112 700/119 |
| 2014/0180914 A1* | 6/2014 | Abhyanker | G06Q 10/0832 705/332 |
| 2014/0200697 A1* | 7/2014 | Cheng | G06Q 30/06 700/98 |
| 2014/0214684 A1* | 7/2014 | Pell | G06Q 30/02 705/57 |
| 2014/0244433 A1* | 8/2014 | Cruz | G06T 7/001 705/26.8 |
| 2014/0254896 A1* | 9/2014 | Zhou | G06Q 20/3829 705/16 |
| 2014/0271200 A1* | 9/2014 | Sutton | B64C 27/33 29/889 |
| 2014/0283104 A1* | 9/2014 | Nilsson | H04N 1/32117 726/26 |
| 2014/0309813 A1* | 10/2014 | Ricci | G06V 20/59 701/1 |
| 2014/0325218 A1* | 10/2014 | Shimizu | H04L 12/10 713/168 |
| 2014/0330456 A1* | 11/2014 | Lopez Morales | G06Q 10/087 701/3 |
| 2015/0006005 A1* | 1/2015 | Yu | G05D 1/667 701/22 |
| 2015/0066178 A1* | 3/2015 | Stava | B22F 10/47 700/98 |
| 2015/0069968 A1* | 3/2015 | Pounds | B60L 53/35 320/109 |
| 2015/0098819 A1* | 4/2015 | Tourin | G01M 5/0091 416/61 |
| 2015/0102154 A1* | 4/2015 | Duncan | G05D 1/0094 701/300 |
| 2015/0112837 A1* | 4/2015 | O'Dea | G06Q 20/24 705/26.41 |
| 2015/0112885 A1* | 4/2015 | Fadell | G08B 29/185 705/330 |
| 2015/0120094 A1* | 4/2015 | Kimchi | B64U 10/14 701/3 |

(56) References Cited

U.S. PATENT DOCUMENTS

| | | | |
|---|---|---|---|
| 2015/0120602 A1* | 4/2015 | Huffman | G06Q 10/083 700/214 |
| 2015/0127712 A1* | 5/2015 | Fadell | H04L 12/2807 709/202 |
| 2015/0129716 A1* | 5/2015 | Yoffe | B64F 1/029 244/110 C |
| 2015/0153175 A1 | 6/2015 | Skaaksrud | |
| 2015/0154545 A1 | 6/2015 | Skaaksrud et al. | |
| 2015/0158599 A1* | 6/2015 | Sisko | B64F 1/20 244/114 R |
| 2015/0175276 A1* | 6/2015 | Koster | A47G 29/14 244/114 R |
| 2015/0183528 A1* | 7/2015 | Walsh | B64C 39/024 244/114 R |
| 2015/0185034 A1* | 7/2015 | Abhyanker | G05D 1/0088 701/23 |
| 2015/0191255 A1* | 7/2015 | Zolich | B64F 1/16 340/946 |
| 2015/0202770 A1* | 7/2015 | Patron | G06Q 50/01 901/50 |
| 2015/0227882 A1* | 8/2015 | Bhatt | G06Q 10/083 705/330 |
| 2015/0246727 A1* | 9/2015 | Masticola | G08B 29/145 701/2 |
| 2015/0253777 A1* | 9/2015 | Binney | G05D 1/0214 701/28 |
| 2015/0254611 A1* | 9/2015 | Perez | G06Q 10/08355 705/5 |
| 2015/0259078 A1* | 9/2015 | Filipovic | H04W 4/38 244/114 R |
| 2015/0286216 A1* | 10/2015 | Miwa | G05D 1/0808 701/4 |
| 2015/0314881 A1* | 11/2015 | Tsaliah | B64D 17/725 244/146 |
| 2015/0317597 A1* | 11/2015 | Shucker | G06Q 10/0833 235/375 |
| 2015/0332206 A1* | 11/2015 | Trew | G06Q 10/083 705/330 |
| 2015/0336670 A1* | 11/2015 | Zhang | B29C 43/18 244/119 |
| 2015/0367850 A1* | 12/2015 | Clarke | H04N 23/90 701/28 |
| 2015/0370251 A1* | 12/2015 | Siegel | B64D 1/22 701/2 |
| 2016/0001877 A1* | 1/2016 | Paulos | B64U 30/29 701/3 |
| 2016/0009413 A1* | 1/2016 | Lee | G08G 5/57 701/16 |
| 2016/0019495 A1* | 1/2016 | Kolchin | G06Q 10/0833 705/333 |
| 2016/0033966 A1* | 2/2016 | Farris | G01C 21/20 701/16 |
| 2016/0051110 A1* | 2/2016 | Cao | A47L 9/009 15/324 |
| 2016/0058181 A1* | 3/2016 | Han | H04N 23/661 312/236 |
| 2016/0068267 A1* | 3/2016 | Liu | G05D 1/042 701/4 |
| 2016/0070265 A1* | 3/2016 | Liu | B64C 39/024 701/25 |
| 2016/0085238 A1* | 3/2016 | Hayes | G08G 5/22 701/4 |
| 2016/0104099 A1* | 4/2016 | Villamar | G06Q 10/08 705/26.81 |
| 2016/0104113 A1* | 4/2016 | Gorlin | G06Q 10/08355 705/338 |
| 2016/0107750 A1* | 4/2016 | Yates | B64U 10/25 244/2 |
| 2016/0114488 A1* | 4/2016 | Mascorro Medina | B25J 9/1697 901/1 |
| 2016/0117931 A1* | 4/2016 | Chan | G08G 5/56 701/120 |
| 2016/0125746 A1* | 5/2016 | Kunzi | G08G 5/55 701/11 |
| 2016/0129592 A1* | 5/2016 | Saboo | B25J 5/007 700/248 |
| 2016/0130015 A1* | 5/2016 | Caubel | B64C 27/001 244/120 |
| 2016/0132059 A1* | 5/2016 | Mason | B65G 1/1373 701/28 |
| 2016/0144734 A1* | 5/2016 | Wang | B64C 29/0016 701/17 |
| 2016/0144982 A1* | 5/2016 | Sugumaran | B64C 25/32 244/108 |
| 2016/0180618 A1* | 6/2016 | Ho | G07C 9/00563 340/5.52 |
| 2016/0196755 A1* | 7/2016 | Navot | G05D 1/0088 701/4 |
| 2016/0196756 A1* | 7/2016 | Prakash | B64U 80/25 701/3 |
| 2016/0200438 A1* | 7/2016 | Bokeno | B64C 39/024 244/2 |
| 2016/0207627 A1* | 7/2016 | Hoareau | B64D 1/02 |
| 2016/0214717 A1* | 7/2016 | De Silva | B64D 5/00 |
| 2016/0214728 A1* | 7/2016 | Rossi | B64U 30/291 |
| 2016/0221671 A1* | 8/2016 | Fisher | B64U 30/26 |
| 2016/0229530 A1* | 8/2016 | Welsh | B64U 30/24 |
| 2016/0235236 A1* | 8/2016 | Byers | A47G 29/14 |
| 2016/0236778 A1 | 8/2016 | Takayama et al. | |
| 2016/0239789 A1* | 8/2016 | Hanks | G06Q 30/04 |
| 2016/0239803 A1* | 8/2016 | Borley | G06Q 10/08355 |
| 2016/0257401 A1* | 9/2016 | Buchmueller | G01C 21/343 |
| 2016/0258775 A1* | 9/2016 | Santilli | G06Q 10/083 |
| 2016/0266578 A1* | 9/2016 | Douglas | G05D 1/0282 |
| 2016/0282126 A1* | 9/2016 | Watts | G06Q 10/08 |
| 2016/0299233 A1* | 10/2016 | Levien | G08G 5/53 |
| 2016/0321503 A1* | 11/2016 | Zhou | B64U 50/38 |
| 2016/0334229 A1* | 11/2016 | Ross | G08B 25/00 |
| 2016/0340021 A1* | 11/2016 | Zhang | B64C 27/006 |
| 2016/0364660 A1* | 12/2016 | Brown | G01C 21/20 |
| 2016/0364679 A1* | 12/2016 | Cao | G06Q 10/083 |
| 2016/0364823 A1* | 12/2016 | Cao | G06Q 50/40 |
| 2016/0364989 A1* | 12/2016 | Speasl | G08G 5/57 |
| 2016/0371984 A1* | 12/2016 | Macfarlane | G05D 1/106 |
| 2017/0011333 A1* | 1/2017 | Greiner | G06K 7/10722 |
| 2017/0011340 A1* | 1/2017 | Gabbai | G05D 1/667 |
| 2017/0032315 A1* | 2/2017 | Gupta | G06Q 10/08 |
| 2017/0087999 A1* | 3/2017 | Miller | G01C 21/3679 |
| 2017/0096222 A1* | 4/2017 | Spinelli | B64U 80/25 |
| 2017/0098378 A1 | 4/2017 | Soundararajan et al. | |
| 2017/0100837 A1* | 4/2017 | Zevenbergen | G05D 1/0225 |
| 2017/0101017 A1 | 4/2017 | Streett | |
| 2017/0113352 A1* | 4/2017 | Lutz | B25J 9/1682 |
| 2017/0147975 A1* | 5/2017 | Natarajan | G06Q 10/0832 |
| 2017/0152060 A1* | 6/2017 | Morisawa | B64U 50/23 |
| 2017/0154347 A1* | 6/2017 | Bateman | G06Q 10/067 |
| 2017/0164319 A1 | 6/2017 | Skaaksrud et al. | |
| 2017/0167881 A1* | 6/2017 | Rander | B60W 60/0016 |
| 2017/0193442 A1* | 7/2017 | Ekkel | G06Q 10/083 |
| 2017/0199522 A1* | 7/2017 | Li | G07C 5/0866 |
| 2017/0225783 A1* | 8/2017 | Fisher | B64U 20/87 |
| 2017/0255896 A1* | 9/2017 | Van Dyke | G06Q 10/0835 |
| 2017/0286905 A1* | 10/2017 | Richardson | G06Q 10/0836 |
| 2017/0300855 A1* | 10/2017 | Lund | B64F 5/10 |
| 2017/0305526 A1* | 10/2017 | Thomassey | B64C 27/26 |
| 2017/0308098 A1 | 10/2017 | Yu et al. | |
| 2017/0316379 A1* | 11/2017 | Lepek | G06Q 10/047 |
| 2017/0330145 A1* | 11/2017 | Studnicka | G07C 9/00896 |
| 2017/0345245 A1* | 11/2017 | Torresani | H04W 4/80 |
| 2017/0372256 A1* | 12/2017 | Kantor | G08G 5/34 |
| 2018/0024554 A1* | 1/2018 | Brady | G06Q 10/0833 701/23 |
| 2018/0088586 A1* | 3/2018 | Hance | G05D 1/0236 |
| 2018/0118340 A1* | 5/2018 | Russo | B64U 50/37 |
| 2018/0127211 A1* | 5/2018 | Jarvis | G05D 1/0285 |
| 2018/0137454 A1* | 5/2018 | Kulkarni | G05D 1/021 |
| 2018/0203464 A1 | 7/2018 | Yu et al. | |
| 2018/0257775 A1* | 9/2018 | Baek | B64U 30/26 |

(56) References Cited

U.S. PATENT DOCUMENTS

| | | | |
|---|---|---|---|
| 2019/0051192 A1* | 2/2019 | Schick | G08G 5/80 |
| 2019/0135403 A1* | 5/2019 | Perry | B64U 10/25 |
| 2019/0161190 A1* | 5/2019 | Gil | H04L 67/55 |
| 2019/0172358 A1* | 6/2019 | Zhou | G06V 20/17 |
| 2020/0272144 A1* | 8/2020 | Yang | B64U 10/14 |
| 2020/0284883 A1* | 9/2020 | Ferreira | G01S 7/4815 |
| 2020/0324898 A1* | 10/2020 | Youmans | G06V 20/176 |
| 2020/0369384 A1* | 11/2020 | Kelly | G08G 5/32 |
| 2021/0089055 A1* | 3/2021 | Tran | G08G 5/55 |
| 2021/0094686 A1* | 4/2021 | Metzner | G08B 13/1965 |
| 2022/0009647 A1* | 1/2022 | Johannesson | B64U 20/96 |
| 2022/0144424 A1 | 5/2022 | Metzner et al. | |
| 2022/0162001 A1* | 5/2022 | Gherardi | G05D 1/0088 |
| 2022/0163980 A1* | 5/2022 | Beer | G05D 1/228 |
| 2022/0278538 A1* | 9/2022 | Kainzmaier | B60L 53/36 |
| 2023/0044050 A1* | 2/2023 | Cevacins | B64U 70/97 |
| 2023/0045691 A1* | 2/2023 | Cevacins | B64U 60/00 |
| 2023/0065140 A1* | 3/2023 | Blevins | B64U 20/40 |
| 2023/0167653 A1* | 6/2023 | Waters | B64U 80/25 244/114 R |
| 2023/0244249 A1* | 8/2023 | Smith | G05D 1/2469 701/11 |
| 2023/0298268 A1* | 9/2023 | Oleynikova | B60W 30/09 |
| 2024/0010368 A1* | 1/2024 | Liao | B64U 80/10 |
| 2024/0051688 A1* | 2/2024 | Valero | B64C 39/08 |
| 2025/0108943 A1* | 4/2025 | Sekiguchi | B64U 80/20 |
| 2025/0269989 A1* | 8/2025 | Hasni | H01Q 5/307 |

FOREIGN PATENT DOCUMENTS

| | | |
|---|---|---|
| CN | 203039518 U | 7/2013 |
| CN | 103365297 A | 10/2013 |
| CN | 104760704 A | 7/2015 |
| CN | 109118826 A | 1/2019 |
| DE | 102011086497 A1 | 5/2013 |
| EP | 3415436 A1 | 12/2018 |
| FR | 2692064 A1 | 12/1993 |
| GB | 2455374 A | 6/2009 |
| JP | S48088255 U | 10/1973 |
| JP | S56048952 | 11/1981 |
| JP | H0712088 A | 1/1995 |
| JP | 2004126800 A | 4/2004 |
| JP | 2009297449 A | 12/2009 |
| JP | 2010095246 A | 4/2010 |
| JP | 2011211025 A | 10/2011 |
| JP | 2012037204 A | 2/2012 |
| WO | 2007052246 A1 | 5/2007 |
| WO | 2008147484 A2 | 12/2008 |
| WO | 2008147484 A3 | 2/2009 |
| WO | 2009153588 A1 | 12/2009 |
| WO | 2010070717 A1 | 6/2010 |
| WO | 2012012752 A2 | 1/2012 |
| WO | 2012012752 A9 | 6/2012 |
| WO | 2013140085 A1 | 9/2013 |
| WO | 2013148123 A1 | 10/2013 |
| WO | 2014064431 A2 | 5/2014 |
| WO | 2014068982 A1 | 5/2014 |
| WO | 2014080409 A1 | 5/2014 |
| WO | 2014064431 A3 | 7/2014 |
| WO | 2017064202 A1 | 4/2017 |
| WO | 2018156991 A1 | 8/2018 |

OTHER PUBLICATIONS

Sánchez-Ibáñez, J. R., et al., "Path Planning for Autonomous Mobile Robots: a Review," www.mdpi.com, Copyright 1996-2024 MDPI (Basel, Switzerland), URL: https://www.mdpi.com/1424-8220/21/23/7898 (Year: 2021), 29 pages.

Andrew Amato, "Parrot Announces New Bobop Drone", Dronelife.com, May 12, 2014; http://dronelife.com/2014/05/12/parrot-announces-new-bebop-drone/, accessed Dec. 21, 2016.

Bullock et al., "Analysis of the Use of Digital Road Maps in Vehicle Navigation," 1994, IEEE, p. 494-501 (Year: 1994).

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

DHL Trend Research, "Unmanned Aerial Vehicles in Logistics: a DHL perspective on implications and use cases for the logistics industry," 2014, Markus Kuckelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Hawas et al., "Infrastructureless Inter-Vehicular Real-Time Route Guidance," 2008, IEEE, p. 1213-1219 (Year: 2008).

Ivan Barajas, "Parrot Unveils New Drone and Controller," May 14, 2014; https://blog.newegg.com/parrot-unveils-drone-controller-oculus-compatible/, accessed Dec. 21, 2016.

Kais, Mikael et al., "An Intelligent architecture for automated transportation in our cities", 2001 European Control Conference (ECC), Porto, Portugal, Sep. 4-7, 2001, pp. 277-282 (Year: 2001).

Kladis et al., "Event-Based Energy Optimum Route Planning in the Context of Unmanned Aerial Vehicles for Multi-Objective Exploration Missions," 2009, IEEE, p. 1281-1286 (Year: 2009).

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Microchip Technology Inc. AT42QT1010 Data Sheet. Copyright © 2017 Microchip Technology Inc. 30 pages.

MicroPilot home page, https://www.micropilot.com/; archived on Jan. 3, 2013 by Internet Archive, http://web.archive.org/web/2013103180733/http://www.micropilot.com/?, accessed May 2, 2016.

Mike Murphy, "Google wants to deliver packages from self-driving trucks," published Feb. 9, 2016, URL: https://qz.com/613277/google-wants-to-deliver-packages-from-self-driving-trucks/, 4 pages.

Nanohawk Aeraccess: "Unmanned Aerial Vehicle—Aeraccess—Nanohawk—Webarchive Jun. 16, 2019", Jun. 16, 2019 (Jun. 16, 2019), pp. 1-3, XP055759013, URL: https://web.archive.org/web/20190616235755/http://www.aeraccess-group.com/product/indoor/nanohawk [Retrieved from the Internet: Dec. 10, 2020]; the whole document.

Navaravong et al., "Formation Reconfiguration for Mobile Robots with Network Connectivity Constraints," 2012, IEEE, p. 18-24 (Year: 2012).

Norman Chan, "Hands-On with Parrot's Bebop Drone Quadcopter", tested.com, May 12, 2014; http://www.tested.com/tech/robots/461148-parrots-bebop-drone-what-you-should-know/, accessed Dec. 22, 2016.

Parent, Michel et al., "Intelligent Transportation in Cities with CTS", The IEEE 5th International Conference on Intelligent Transportation Systems, Sep. 3-6, 2002, Singapore, pp. 826-830 (Year: 2002).

rchelicopterfun.com, "Parrot AF Drone Quadcopter Review", http://www.rchelicopterfun.com/parrot-ar-drone.html; archived on Mar. 27, 2012 by Internet Archive, http://web.archive.org/web/20120327140509/http://www.rchelicopterfun.com/parrot-ar-drone.html, accessed Apr. 27, 2016.

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

Smith, Randall C., and Peter Cheeseman, "On the Representation and Estimation of Spatial Uncertainty," The Int'l Journal of Robotics Research, vol. 5, No. 4 (Winter 1986), Copyright 1986 Massachusetts Institute of Technology, 14 pages.

URL: https://web.archive.org/web/20160804001046/https://www.starship.xyz/, download date: Aug. 4, 2016, 21 pages.

Wang, David. Application Report: FDC1004: Basics of Capacitive Sensing and Applications. SNOA927A—Dec. 2014—Revised Jun. 2021. Copyright © 2021 Texas Instruments Incorporated. 12 pages.

(56) References Cited

OTHER PUBLICATIONS

Wikipedia, "Apollo Abort Modes", https://en.wikipedia.org/wiki/Apollo_abort_modes; archived by Internet Archive on Aug. 16, 2012, https://web.archive.org/web/20120816115115/https://en.wikipedia.org/wiki/Apollo_abort_modes; accessed Jul. 9, 2019 (Year: 2012).

Wikipedia, "Space Shuttle Abort Modes," https://en.wikipedia.org/wiki/Space_Shuttle_abort_modes; archived by Internet Archive on Aug. 15, 2012, https://web.archive.org/web/20120815031221/https://en.wikipedia.org/wiki/Space_Shuttle_abort_modes; accessed Jul. 9, 2019 (Year: 2012).

Wikipedia, "Ramer-Douglas-Peucker Algorithm," www.wikipedia.com, Wikipedia: The Free Encyclopedia, 5 pages, Aug. 18, 2022, URL: https://en.wikipedia.org/wiki/Ramer%E2%80%93Douglas%E2%80%93Peucker_algorithm, obtained via web.archive.org on Jan. 6, 2023.

\* cited by examiner

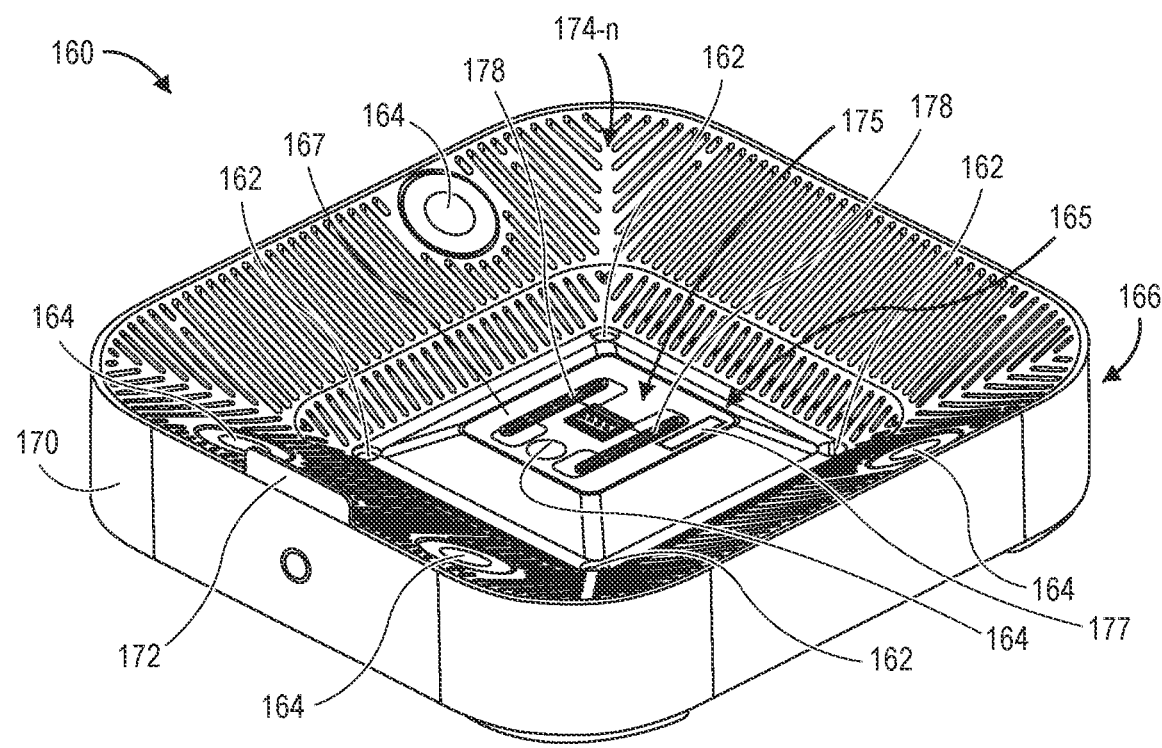
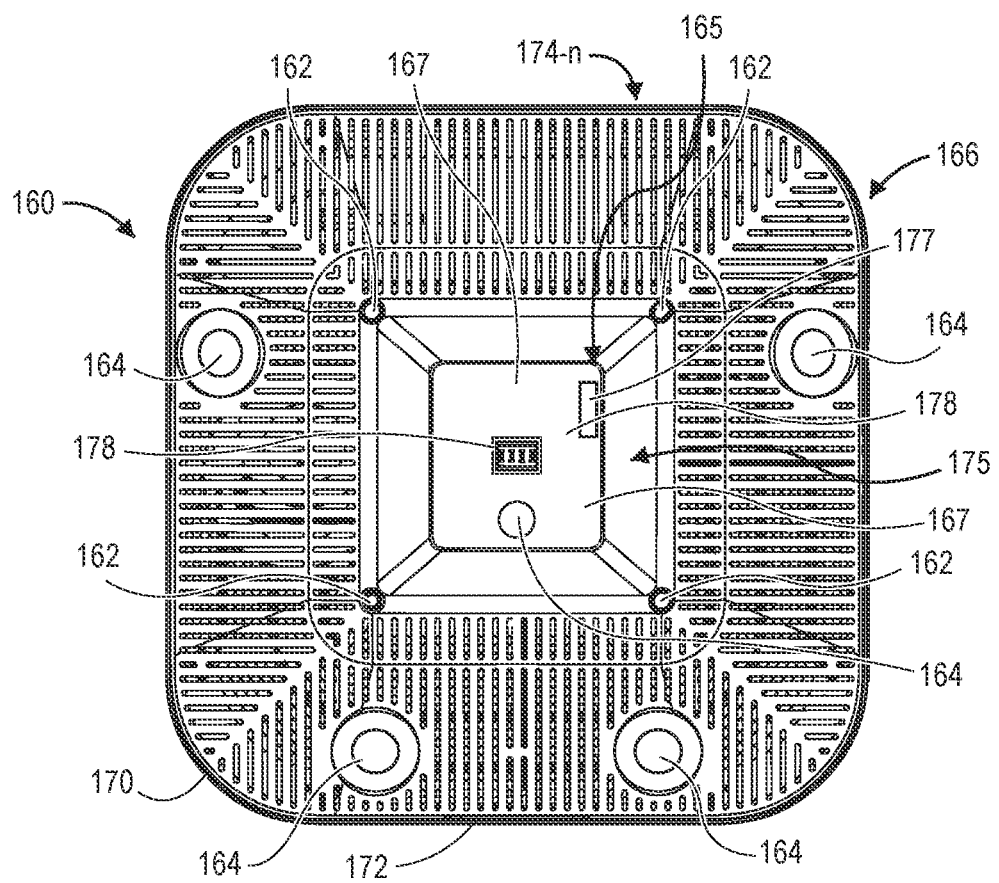
FIG. 1B

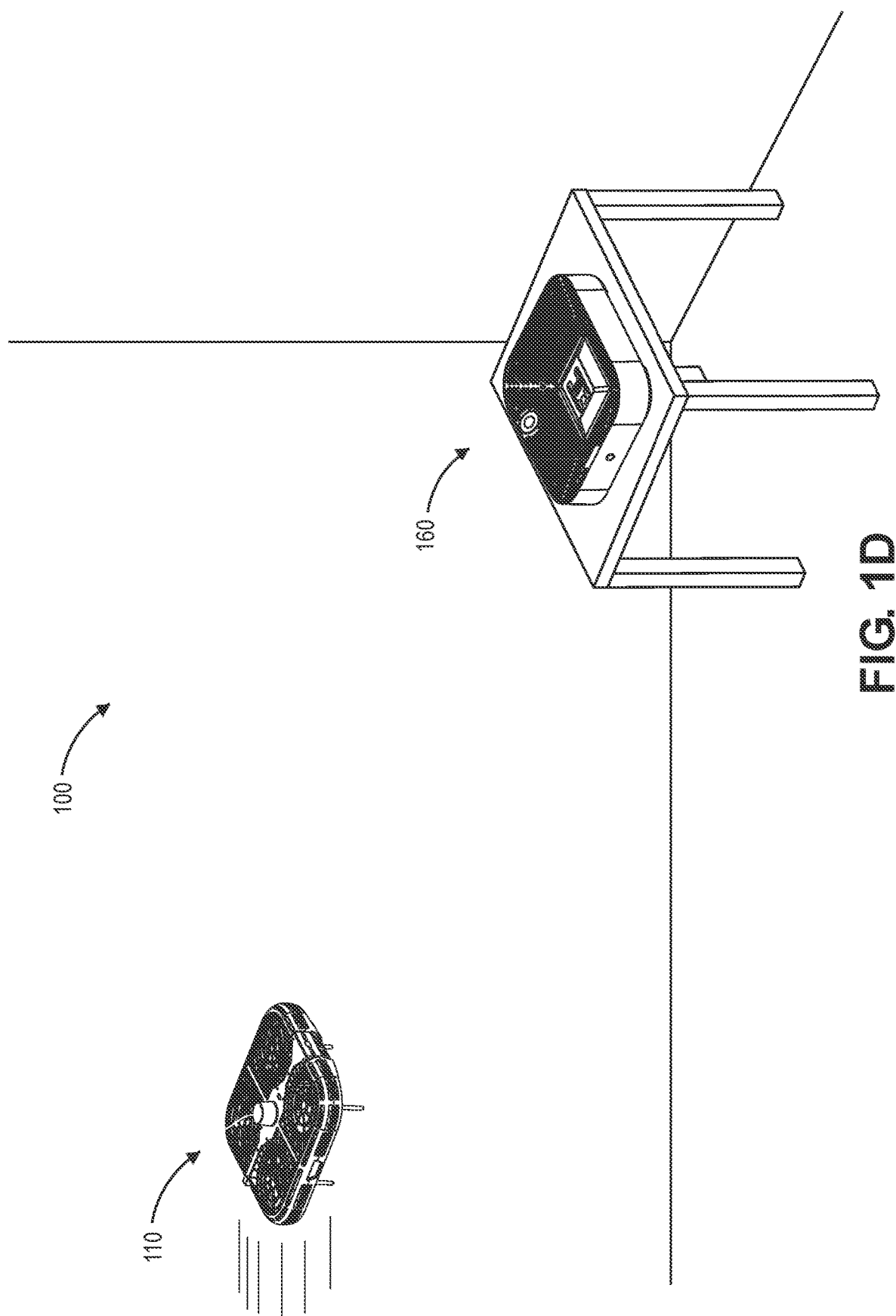

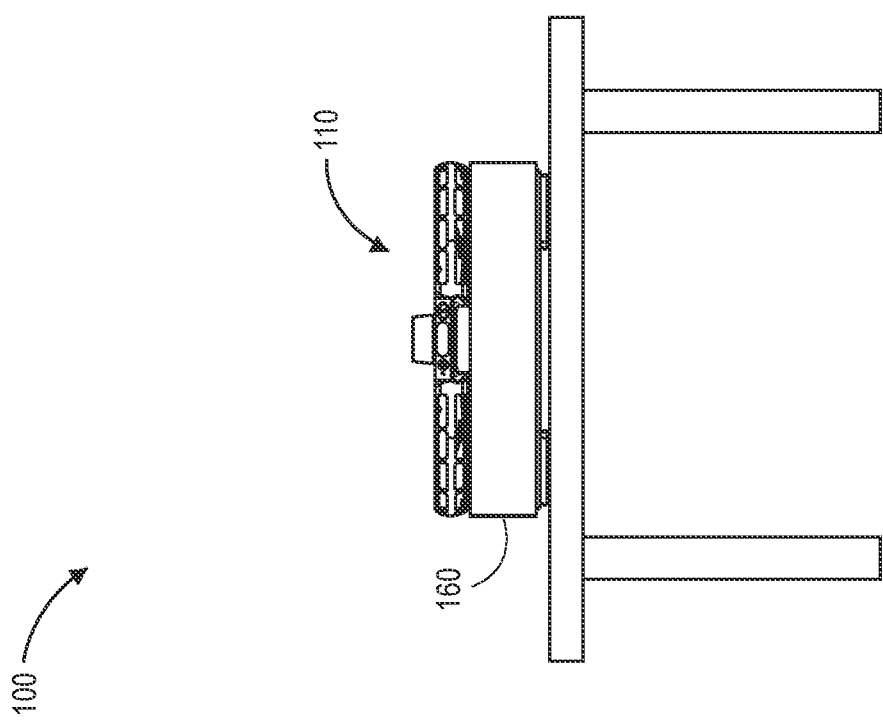

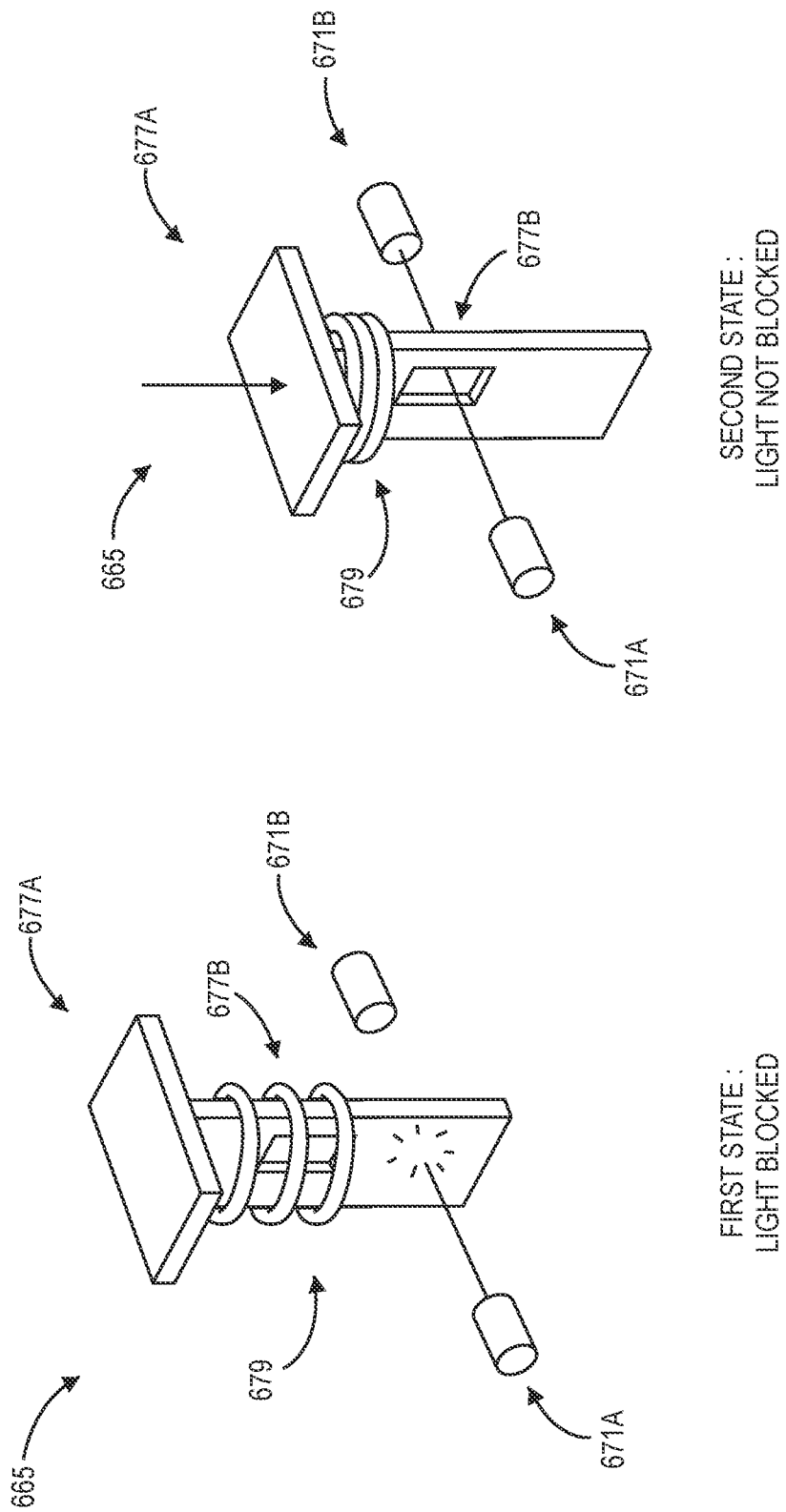
FIG. 6A FIRST STATE: LIGHT BLOCKED
FIG. 6B SECOND STATE: LIGHT NOT BLOCKED

DOCKING STATIONS FOR SAFELY CHARGING AERIAL VEHICLES

BACKGROUND

Aerial vehicles are most commonly operated in outdoor spaces. When an aerial vehicle operates in an outdoor space, the aerial vehicle may take off from a fixed or mobile location, e.g., a runway, a landing pad, or any like facility or station, by causing motors to generate lift and elevate the aerial vehicle to a selected altitude or position. The aerial vehicle may then travel on any selected courses, speeds or altitudes. Prior to taking off, or while in flight, an aerial vehicle operating outdoors may determine its position in three-dimensional space using a position sensor, e.g., a Global Positioning System ("GPS") receiver that captures signals from one or more satellites or other sources, as well as an inertial measurement unit (or "IMU"), one or more altimeters, barometers, or other components. An aerial vehicle may rely on such sensors to travel to a specific location, which may be the same location from which the aerial vehicle took off, or a different location, before completing a landing evolution.

Operating an aerial vehicle, or drone, within indoor spaces presents a unique set of challenges for the aerial vehicle, and creates unique risks for occupants or contents of the indoor spaces. For example, most aerial vehicles that operate within indoor spaces are commonly powered by electricity, e.g., using electrical motors and control systems that are powered by one or more rechargeable batteries, rather than from standard combustible aviation fuels that result in the generation of noxious fumes as byproducts during operation. Naturally, however, an aerial vehicle that relies on batteries to provide electrical power during operations must necessarily recharge or replace the batteries between missions of the aerial vehicle.

Traditionally, batteries have been charged from external power sources in a number of ways, such as by inserting plugs of cords into ports provided on the batteries or on casings or housings in which the batteries are maintained during use, or by removing the batteries from the casings or housings and inserting the batteries into chargers or other devices, and charging the batteries from external power sources by way of the cords or the chargers. While inserting a plug into a surface of a battery or an aerial vehicle, or removing the battery from the aerial vehicle, are simple tasks that may be readily performed by humans, such tasks are difficult to perform without human intervention in a manner that enables the aerial vehicle to operate autonomously, and to remain available to perform missions on an as-needed basis.

BRIEF DESCRIPTION OF THE DRAWINGS

FIGS. 1A through 1I are views of aspects of one system in accordance with embodiments of the present disclosure.

FIGS. 6A and 6B are views of aspects of one system in accordance with implementations of the present disclosure.

DETAILED DESCRIPTION

Figure 1A:
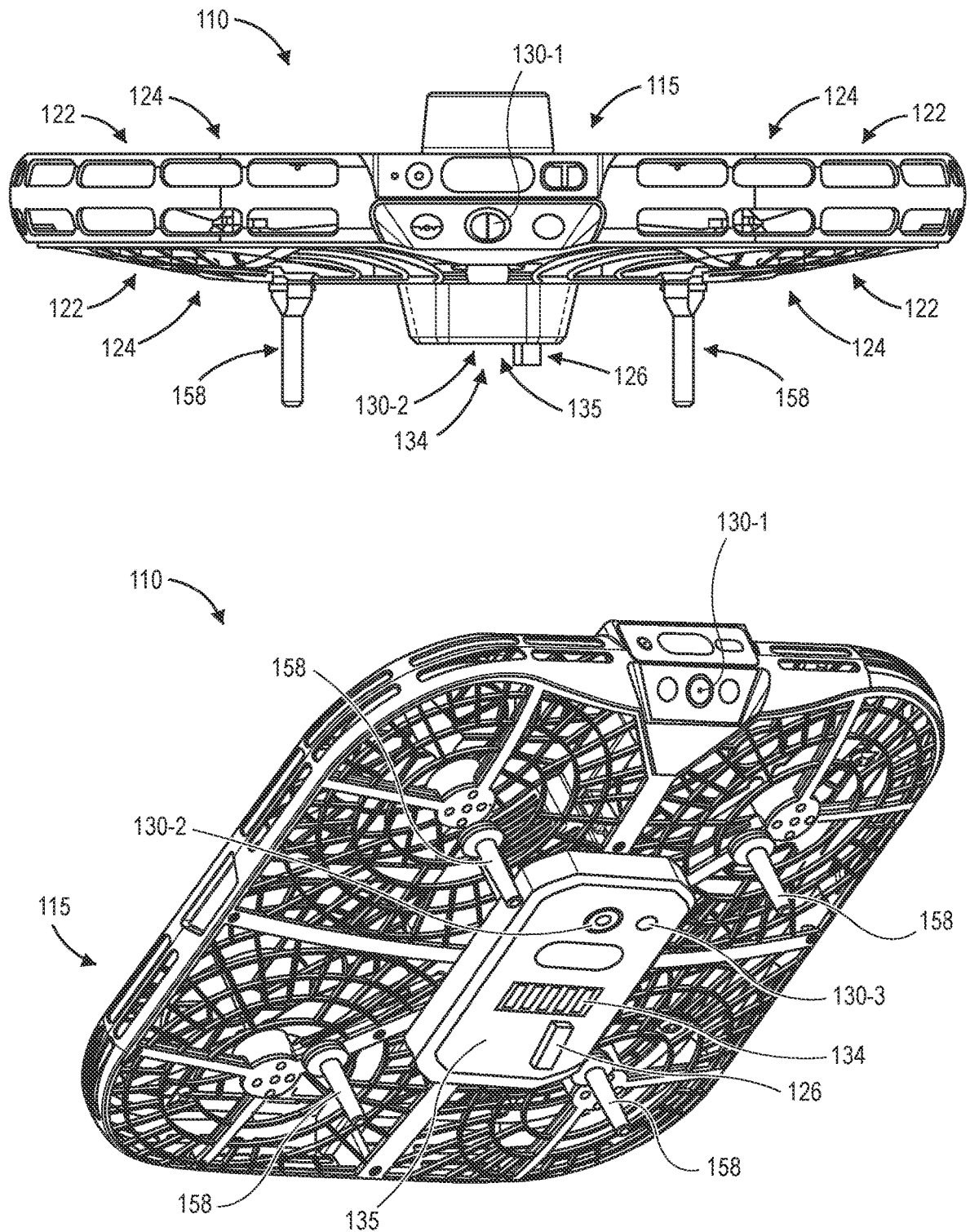

As is set forth in greater detail below, the present disclosure is directed to docking stations (or charging stations) for safely charging aerial vehicles (e.g., drones) that are configured for operation within indoor spaces. More specifically, the present disclosure is directed to docking stations (or charging stations) having housings that are configured with sensor triggers for initiating or terminating transfer of electrical power to the aerial vehicles when docked therein. The sensor triggers may include movable members or insertable elements having sizes, shapes and orientations corresponding to rib-like extensions provided on undersides of aerial vehicles, and sensors disposed proximate the movable members or insertable elements.

When an aerial vehicle docks in a docking station, an electrical contact provided on an underside of the aerial vehicle contacts a corresponding electrical contact provided on an upper surface of the docking station, as a rib-like extension of the aerial vehicle interacts with a sensor trigger provided within a housing of a docking station. The rib-like extension of the aerial vehicle depresses a movable member or an insertable element of the sensor trigger into the housing of the docking station by at least a predetermined distance, and causes the sensor trigger to transition from a first state in which electrical power is not supplied to the electrical contact provided on an upper surface of the docking station, to a second state in which electrical power is supplied to the electrical contact. Consequently, electrical power is transferred to the electrical contact provided on the underside of the aerial vehicle, thereby charging one or more batteries or other onboard power sources of the aerial vehicle.

Sensor triggers of the present disclosure may include any type or form of sensor that is disposed proximate a movable member or an insertable element of a docking station, and configured to transition in state based on a position of the movable member or the insertable element with respect to the proximity sensor. Such sensors may be configured to transmit one or more signals reflective of a state of the sensor trigger to a switch or another component of the docking station for energizing or deenergizing a charging contact accordingly.

In some implementations, a sensor trigger may include a photointerrupter module having a transmitter configured to transmit light across a slot to a receiver, and a movable member or an insertable element aligned for insertion into or removal from the slot. The photointerrupter module may be configured to transition the sensor trigger from a first state when the transmission of light across the slot is not blocked by the movable member or the insertable element, to a second state when the transmission of light across the slot is blocked by the insertable element, or vice versa. A state of the sensor trigger is thus determined based on a position of the movable member or the insertable element. Similarly, a sensor trigger may include a Hall effect sensor and a movable member or an insertable element having a magnetic component provided thereon. The Hall effect sensor may be configured to transition the sensor trigger from a first state to a second state, or vice versa, based on a magnetic field sensed by the Hall effect sensor, which may be determined based on a position of the movable member or the insertable element with respect to the Hall effect sensor. A sensor trigger may also include a proximity sensor, an optical sensor, or any other type or form of sensor, and a movable member or an insertable element having one or more components that act as a target for the proximity sensor, the optical sensor, or any other sensor.

In accordance with one or more implementations, a Hall effect sensor is arranged on a surface of a docking station and a non-symmetric magnet is arranged on a surface of an aerial vehicle (e.g., a drone). Readings of the Hall effect sensor will vary depending on an orientation of the non-symmetric magnet (and thus the aerial vehicle), allowing the presence and the orientation of the aerial vehicle to be determined based on sensor data generated by the Hall effect sensor. In accordance with one or more implementations, processor-executable instructions stored on the docking station enable a charging contact to be energized, e.g., by closing a switch, only when the presence of the aerial vehicle has been detected, and when the aerial vehicle is in a certain orientation, based on the sensor data.

The docking stations of the present disclosure may provide support for aerial vehicles prior to or following the performance of any number of operations or evolutions by the aerial vehicles within indoor spaces. For example, one or more of the docking stations of the present disclosure may be utilized by an aerial vehicle that is programmed or configured to monitor any events or conditions occurring within an indoor space, or to confirm or verify the existence or presence of any such events or conditions, e.g., any hazardous, abnormal or undesirable events or conditions, or evaluate the spaces regularly or periodically, or at scheduled or random times.

Referring to FIGS. 1A through 1I, views of aspects of one system in accordance with embodiments of the present disclosure are shown. FIG. 1A includes a front view of an aerial vehicle 110 and a perspective view of an underside of the aerial vehicle 110.

As is shown in FIG. 1A, the aerial vehicle 110 defines a housing 115 having a plurality of propulsion motors 122 disposed therein. Each of the propulsion motors 122 may be powered by electricity, e.g., from one or more onboard batteries or other power sources, and coupled to a propeller 124. The propulsion motors 122 may be capable of generating sufficient rotational speeds of the propellers 124 or other components to provide thrust and/or lift forces to the aerial vehicle 110 and any payload engaged thereby.

The aerial vehicle 110 may also include an inertial measurement unit that may be installed or embedded within a frame or one or more appurtenances of the aerial vehicle 110 and provided in association with an inertial navigation system, a control system, or any other aspect or component of the aerial vehicle 110. The inertial measurement unit may be configured to detect changes in linear or rotational motion of the aerial vehicle 110, e.g., based on data regarding accelerations experienced by the aerial vehicle 110, angular velocities of the aerial vehicle 110, or magnetic fields sensed by the aerial vehicle 110, using one or more gyroscopes, accelerometers and/or compasses provided therein.

The aerial vehicle 110 further includes a camera 130-1 having a field of view with an axis of orientation that extends normal from a substantially flat face that is angled in a downward direction with respect to the housing 115 of the aerial vehicle 110, e.g., below a plane defined by the housing 115 of the aerial vehicle 110 that includes pitch and roll axes of the aerial vehicle 110. The aerial vehicle 110 also includes a camera 130-2 having a field of view with an axis of orientation that extends normal from a substantially flat surface 135 on an underside of the housing 115 of the aerial vehicle 110, e.g., along or parallel to a yaw axis of the aerial vehicle 110. Alternatively, either or both of the cameras 130-1, 130-2 may be aligned with fields of view or axes of orientation extending in any direction or orientation with respect to the aerial vehicle 110, e.g., forward, aft, port, starboard, up, down, or in any other direction, or at any angle with respect to one or more of the yaw, pitch or roll axes of the aerial vehicle 110, or at any other angle or orientation. The cameras 130-1, 130-2 may be aligned with fixed orientations, or with variable orientations (e.g., rotating or shifting orientations). The aerial vehicle 110 may further include one or more illuminators provided on the underside of the housing 115 of the aerial vehicle 110, such as one or more light-emitting diodes (or "LED"), incandescent bulbs, compact and/or linear fluorescent bulbs, halogen lamps, metal halide lamps, neon lamps, sodium lamps or any other type or form of lights configured to project visible light at any frequency, wavelength or intensity below the aerial vehicle 110 during airborne operations.

Each of the cameras 130-1, 130-2 may be configured to capture visual imaging data or depth imaging data with respect to objects or features that are present within their respective fields of view. In some implementations, imaging data captured by the cameras 130-1, 130-2 may be processed to identify or detect one or more boundaries or other features of objects, e.g., based on one or more edges, contours, outlines, colors, textures, silhouettes, shapes or other characteristics of objects depicted within the imaging data. In some implementations, imaging data captured by the cameras 130-1, 130-2 may likewise be interpreted to detect objects within an indoor space, to calculate distances or ranges to such objects, or to identify boundaries, edges or other features of such objects.

As is further shown in FIG. 1A, the aerial vehicle 110 includes a range sensor 130-3, e.g., a time-of-flight sensor, having an axis of orientation that also extends normal from the surface 135 on the underside of the housing 115 of the aerial vehicle 110 as the camera 130-2. In some implementations, the range sensor 130-3 may be a single-point sensor that is configured to transmit light and capture reflections of the light to calculate a distance to a single point. In some implementations, the range sensor 130-3 may be configured to transmit and receive light within a pyramidal field of view, which may be defined by any angle, e.g., approximately forty-five degrees, or any other angle. Upon receiving data regarding one or more returns of reflections of transmitted light, the range sensor 130-3 may determine a distance to an object, based on an elapsed time between transmissions and returns, or in any other manner.

The surface 135 on the underside of the housing 115 include one or more contacts (or connectors, e.g., charging contacts or charging connectors) 134 or other features for mating with corresponding contacts (or connectors, e.g., charging contacts or charging connectors) of a docking station, such as one or more contacts provided on a surface within a frame of the docking station. The contacts (or connectors) 134 enable electrical power, information or data to be conveyed between the aerial vehicle 110 and a docking station when the aerial vehicle 110 is docked within the docking station.

As is also shown in FIG. 1A, the aerial vehicle 110 includes a rib-like extension (or rib) 126 provided on the same surface 135 on the underside of the housing 115 of the aerial vehicle 110 as the camera 130-2, the range sensor 130-3 and the charging contacts 134. The extension 126 has a substantially rectangularly solid shape and is provided in an eccentric location and orientation with respect to the yaw axis of the aerial vehicle 110. For example, as is shown in FIG. 1A, the extension 126 is aligned parallel to the roll axis of the aerial vehicle 110, and perpendicular to the pitch axis of the aerial vehicle 110, and is set off at a predetermined distance from the yaw axis of the aerial vehicle 110. Alternatively, the extension 126 may have any other size or shape, and need not be provided in an eccentric location or orientation with respect to the yaw axis of the aerial vehicle 110. For example, in some implementations, the extension 126 may be provided along the yaw axis of the aerial vehicle 110. The aerial vehicle 110 further includes a plurality of landing pegs (or struts, or feet) 158, which extend below the surface 135 on the underside of the aerial vehicle 110 and are provided in a predetermined arrangement.

As is further shown in FIG. 1A, tips of the landing pegs 158 each extend farther below the housing 115 of the aerial vehicle 110 than the extension 126. In some implementations, the landing pegs 158 may extend approximately ten times farther below the surface 135 on the underside of the aerial vehicle 110 than a height of the extension 126. For example, in some implementations, the landing pegs 158 may extend approximately fifty millimeters below the surface 135, and the height of the extension 126 with respect to the surface 135 may be approximately five millimeters.

FIG. 1B includes a perspective view of a docking station 160 and a top view of the docking station 160. As is shown in FIG. 1B, the docking station 160 includes a frame 166 and a housing 170. The frame 166 defines a depression 175 or another cavity for accommodating portions of the aerial vehicle 110 therein. The frame 166 includes an upper edge, a bottom section having a shape of a square, or a shape similar to that of a square (e.g., a rounded square, or squircle), and a plurality of angled edge sections having a sloped surface descending down at angles from the upper edge to the bottom section. The frame 166 further includes a plurality of receptacles (or recesses or other openings) 162 that are sized and aligned to accommodate struts, landing feet or other appurtenances at ends of landing pegs of aerial vehicles, such as the landing pegs 158, as well as a plurality of markers (or markings) 164 within the depression 175 formed by the angled edge sections and the bottom section.

As is also shown in FIG. 1B, the frame 166 includes a movable member (or an insertable element) 177 of a sensor trigger 165 that is provided in association with a substantially flat surface 167 of the frame 166 within the depression 175. The movable member 177 has an upper platform that is biased into contact with the surface 167 within which the movable member 177 is provided, e.g., into flush contact with the surface 167, and a lower extension (not shown in FIG. 1B), such as an extension arm, that extends below the surface 167 and into the housing 170. As is further shown in FIG. 1B, a cross-section of the upper platform of the movable member 177 corresponds to a cross-section of the extension 126 provided below the underside of the aerial vehicle 110, and a location of the upper platform of the movable member 177 corresponds to a location of the extension 126 on the underside of the aerial vehicle 110.

For example, as is shown in FIG. 1B, the upper platform of the movable member 177 has a substantially rectangular shape corresponding to a shape of the extension 126 provided on the surface 135 of the underside of the aerial vehicle 110. The upper platform of the movable member 177 is aligned in an eccentric location and orientation that corresponds to the location and orientation of the extension 126 when the aerial vehicle 110 is properly aligned about the yaw axis of the aerial vehicle 110 in order to descent onto and land within the docking station 160.

In some implementations, the movable member 177, and, optionally, portions of the frame 166 may be formed from any type of opaque, non-conductive plastics (e.g., low-friction plastics) having desired properties of friction, including but not limited to low-friction plastics such as nylons, polyethylenes such as polyethylene sulfide, polyethylene terephthalate or other thermoplastics, polyetheretherketones, polytetrafluoroethylenes, or others. The movable member 177 may be biased into contact with the surface 167 of the frame 166, e.g., by one or more springs or other biasing elements, which may be provided or aligned to resist insertion into the frame 166 of the housing 170.

Materials or other features of the frame 166 or the movable member 177 may also be selected to cause the aerial vehicle 110 to slide or otherwise reposition within the depression 175, subject to gravitational forces, when attempting to dock with the docking station 160. For example, the placement or the arrangement of the receptacles 162 within the depression 175, e.g., in a shape of a square or another rectangle, may be selected based on positions of the ends of landing pegs 158 of the aerial vehicle 110, while slopes of the angled edge sections and dimensions of the bottom section may be selected to cause the aerial vehicle 110 to travel into a proper alignment with respect to the docking station 160, such as when one or more of the landing extensions is in contact with one or more of the angled edge sections. As is shown in FIG. 1B, each of the receptacles 162 is provided within a channel defined by the bottom section of the frame, or at the intersection of two of such channels. The channels are arranged in the shape of a square or another rectangle about the bottom section of the frame 166. Moreover, materials from which the frame 166 or the movable member 177 are formed may be selected based on their respective properties of friction.

The housing 170 includes a substantially flat base (not shown in FIG. 1A) and a plurality of walls extending normal to the base. The walls of the housing 170 define an upper rim that mates with or contacts the upper edge of the frame 166. The housing 170 further includes a raised extension 172 (or privacy cover or privacy member) extending from and above one of the walls of the housing 170 above the upper edge of the frame 166. Additionally, the angled edge sections and the bottom section of the frame 166 further include a plurality of openings 174-$n$ (e.g., slits or slit openings) that are aligned or arranged in groups in parallel. The openings 174-$n$ enable downward airflow from the aerial vehicle 110 to pass through the frame 166 and discharge laterally outwardly therefrom when the aerial vehicle 110 is taking off, landing on or into, or otherwise hovering over the docking station 160. The openings 174-$n$ may also provide ventilation for any electronic components provided within the frame 166, e.g., power or communications systems for providing electrical power or data to aerial vehicles 110. For example, as is shown in FIG. 1B, each of the openings 174-$n$ provided in one of the edge sections is oriented such that a lengthwise direction of each of the openings 174-$n$ is aligned in a direction of a slope of the edge section in which the openings 174-$n$ are provided.

The substantially flat surface 167 of the bottom section of the frame 166 within the depression 175 also includes one or more contacts (or connectors, e.g., charging contacts or charging connectors) 178 or other features for mating with corresponding contacts (or connectors) of the aerial vehicle 110, such as the contacts 134 (or connectors, e.g., charging contacts or charging connectors) provided on the surface 135 on the underside of the aerial vehicle 110, when the aerial vehicle 110 is inserted into or enters the depression 175 defined by the frame 166. The contacts (or connectors) 178 enable electrical power, information or data to be conveyed between the aerial vehicle 110 and the docking station 160 when the aerial vehicle 110 is docked within the docking station 160, e.g., by way of the corresponding contacts (or connectors) 134 of the aerial vehicle 110. Additionally, within an enclosure defined by the frame 166 and the housing 170 (not shown), the docking station 160 may further include any number of fans or other equipment for reducing or raising a temperature of the docking station 160 or the aerial vehicle 110 when the aerial vehicle 110 is docked therewith, or maintaining the docking station 160 or such vehicles at any desired temperatures or in any other conditions. The housing 170 may further include one or more openings to facilitate the carrying of the docking station 160 by hand.

The markers 164 may be visual in nature and may include any letter, symbol, icon or other indicator that may be detected within images captured by a camera of the aerial vehicle 110, e.g., the camera 130-2. In some implementations, one or more of the markers 164 may include any number of reflective surfaces or other features (e.g., retroreflectors) that enhance the capacity of the markers 164 to be detected within such images. In some implementations, one or more of the markers 164 may be sources of light, such as a light-emitting diode, or "LED," that project visual light that may be detected by the camera 130-2 or any other optical sensors of the aerial vehicle 110. In such implementations, the camera 130-2 may be a visual camera or, alternatively, an infrared camera that is configured to detect light or heat generated by the respective markers 164.

The plurality of markers 164 includes five markers provided at various locations on upper surfaces of the frame 166 and in a discrete arrangement, e.g., in a shape of a letter W, that is irregular or asymmetric with respect to one or more axes and is uniquely oriented with respect to a position and an orientation of the docking station 160. In some implementations, an arrangement of the markers 164 may have any aspect ratio, which may be selected based on attributes of the camera 130-2 of an aerial vehicle 110, e.g., an aspect ratio of a field of view of the camera 130-2, that is configured to capture images of the markers 164. Thus, when the aerial vehicle 110 attempts a docking evolution at the docking station 160, and the camera 130-2 or other imaging devices of the aerial vehicle 110 captures an image of the frame 166, the aerial vehicle 110 may detect the markers 164 at various locations on the upper surface of the frame 166. The aerial vehicle 110 may then determine a pose (e.g., a position and an orientation) of the docking station 160 with respect to itself from such markings, and may reorient itself with respect to the docking station 160 as necessary, e.g., by traveling to a selected position and rotating about a yaw axis, prior to or during a descent in order to complete a docking evolution in an orientation corresponding to a detected orientation of the docking station 160.

The docking station 160 may have any dimensions in accordance with implementations of the present disclosure. For example, a height of the docking station 160 may be substantially smaller than a length or a width of the docking station 160. In some implementations, the docking station 160 may have lengths and widths of approximately twenty-five to thirty centimeters (25-30 cm), and a height of approximately five to ten centimeters (5-10 cm). In some other implementations, a height or depth of the depression 175 within the frame 166 may be selected on any basis. For example, a height or depth of the depression 175 may be selected based on lengths of landing extensions extending below housings of aerial vehicles that are intended to dock within the docking station 160, e.g., the landing pegs 158 of the aerial vehicle 110.

In accordance with implementations of the present disclosure, a docking station may include a sensor trigger that may operate or exist in at least two states, e.g., a first state and a second state, based on a position of a movable member or an insertable element, such as the movable member 177 of FIG. 1B. The sensor trigger may be configured to maintain a charging contact of a docking station in a deenergized condition when the sensor trigger is in a first state, and to energize the charging contact to initiate a charging evolution for an aerial vehicle when the sensor trigger is in a second state. For example, the sensor trigger may be configured to generate and transmit one or more signals reflective of a state of the sensor trigger to a switch or another component for energizing or deenergizing a charging contact accordingly, and the docking station 160 may include circuitry configured to cause the charging contact to be energized or deenergized when a movable member or an insertable element is in a predetermined position based on such signals.

Figure 1C:
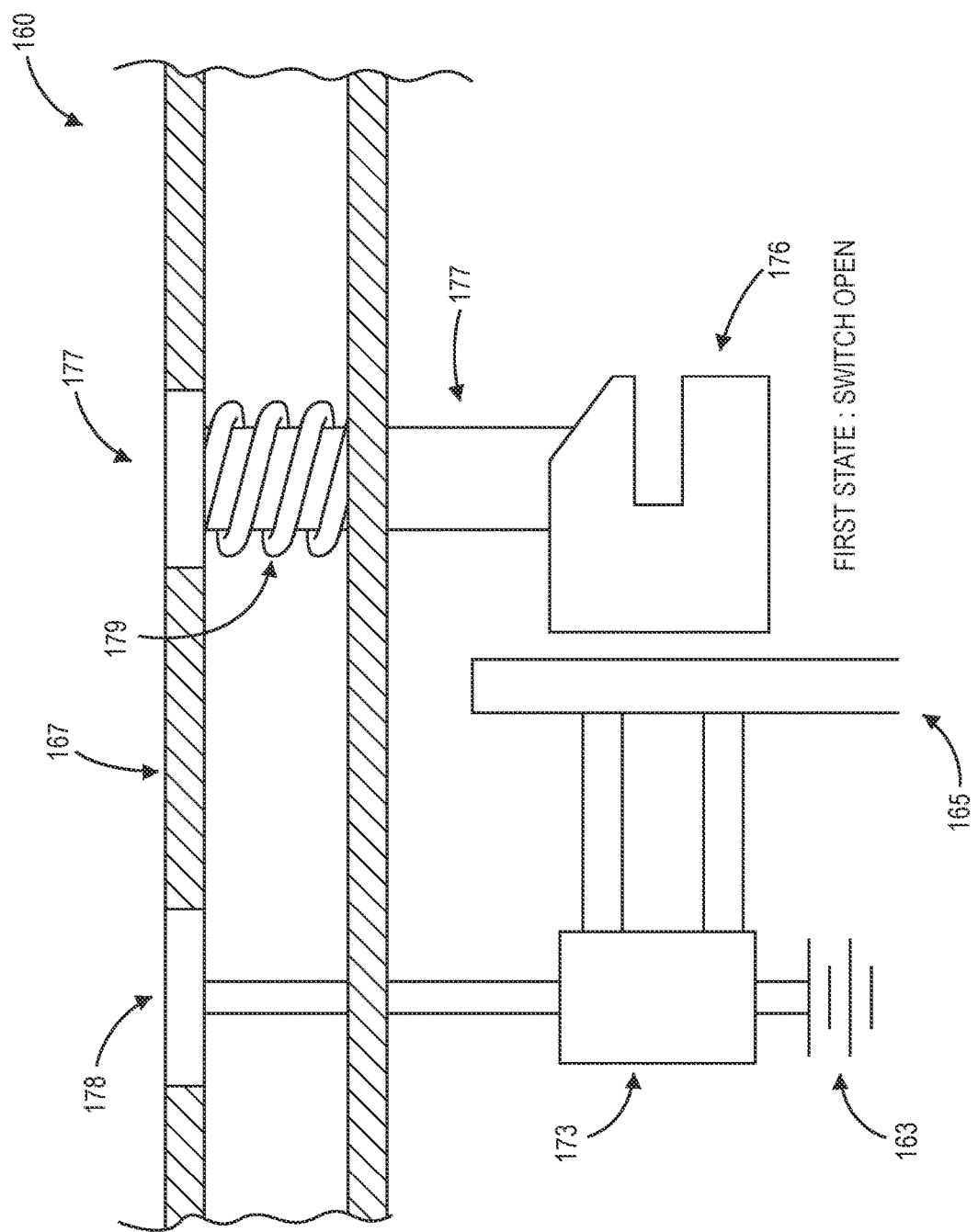

As is shown in FIG. 1C, the upper platform of the movable member 177 is biased into contact with the surface 167 of the docking station 160 by one or more springs 179. The movable member 177 further includes a substantially flat, blade-like lower portion or extension (e.g., an extension arm) that is aligned to enter a slot or another opening of a photointerrupter module 176 (or another sensor) of the sensor trigger 165 that is disposed proximate the movable member 177. The photointerrupter module 176 may be a photosensor including one or more light-emitting elements and one or more light-receiving elements that are aligned to face one another and to enable the transmission and reception of light. The photointerrupter module 176 may be mounted to one or more circuit boards or other features provided within the housing 170 of the docking station 160, and provided in electrical communication with one or more switches 173 of the sensor trigger 165 and power sources 163.

The sensor trigger 165 is in a first state when, as is shown in FIG. 1C, a shield or another obstruction, viz., the movable member 177, is not positioned between the light-emitting elements and the light-receiving elements. With the sensor trigger 165 in the first state shown in FIG. 1C, the switch 173 is open, and the contact 178 is not energized by the power source 163. When the movable member 177 is inserted into the slot or other opening of the photointerrupter module 176 and acts as a shield to block the transmission and reception of light thereby, e.g., when the movable member 177 is depressed by the extension 126 of the aerial vehicle 110, the sensor trigger 165 transitions from the first state shown in FIG. 1C to a second state, thereby causing the switch 173 to close, and the contact 178 to be energized by the power source 163.

As is shown in FIG. 1D, after completing one or more missions, or after determining that a return to the docking station 160 is desired or required, the aerial vehicle 110 selects a position associated with the docking station 160 within a scene (or environment) 100 for completing a docking evolution. The aerial vehicle 110 then operates the one or more propulsion motors 122, control surfaces or other components to cause the aerial vehicle 110 to travel at one or more selected altitudes, on one or more selected courses or at one or more selected speeds to the selected position, and to enable the aerial vehicle 110 to safely begin a docking evolution at the docking station 160. For example, after selecting a position above the docking station 160 for initiating a docking evolution, the aerial vehicle 110 may execute one or more sets of instructions to calculate a trajectory for traveling to the selected position and operate one or more motors to cause the aerial vehicle 110 to travel along the trajectory toward the selected position.

Figure 1E:
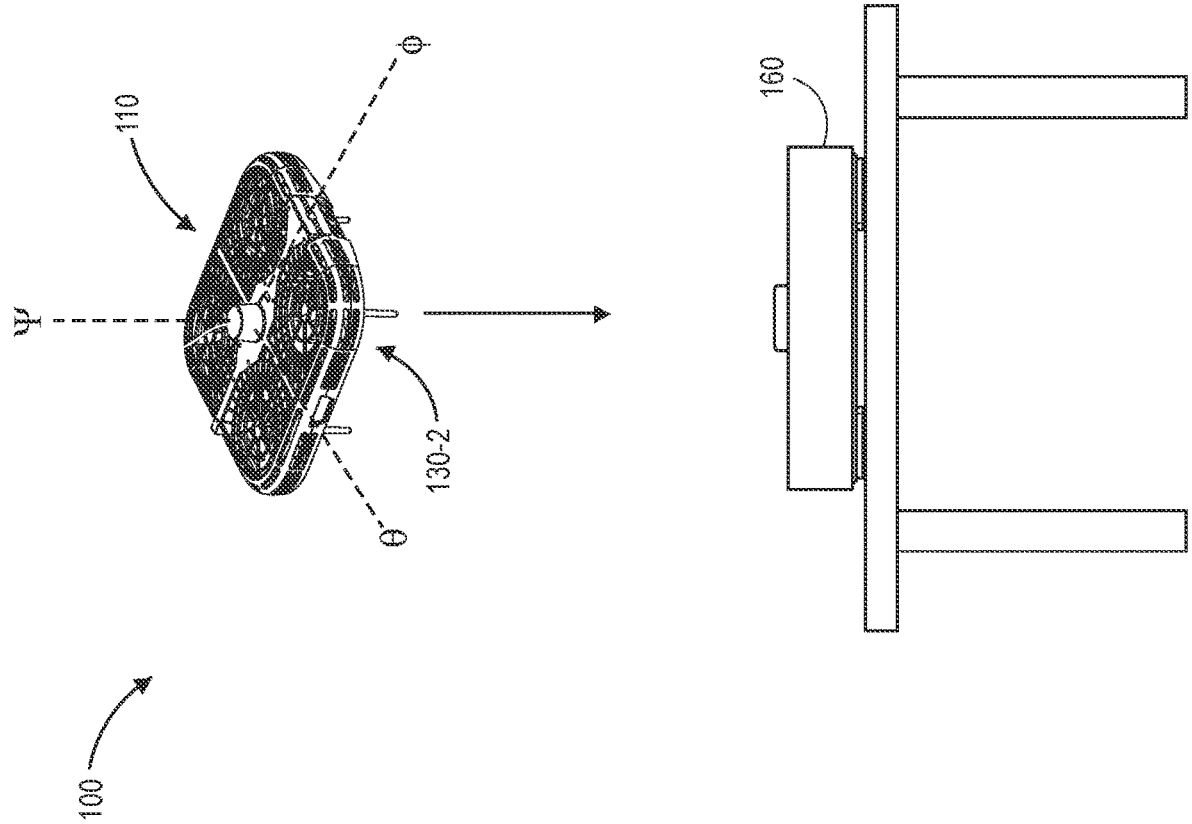

As is shown in FIG. 1E, the aerial vehicle 110 may initiate a docking evolution and begin a descent from a selected position toward the docking station 160. The aerial vehicle 110 may capture imaging data captured using the camera 130-2, and sensor data using one or more navigation sensors, and determine poses with respect to the docking station 160 or the scene 100 based on the imaging data or the sensor data. For example, the aerial vehicle 110 may determine a pose of the aerial vehicle 110 using the camera 130-2, by detecting the markers 164 within images captured by the camera 130-2 and transforming the images as necessary.

In some implementations, the aerial vehicle 110 may detect the markers 164 shown in FIG. 1B within images captured by the camera 130-2 or any other sensors, and determine a position of the aerial vehicle 110 with respect to the docking station 160, e.g., along a yaw axis $\psi$, a pitch axis $\phi$ and a roll axis $\theta$, as well as an orientation of the aerial vehicle 110 with respect to the docking station 160, e.g., angles about the three axes, based on detections of the markings 164. For example, where a sufficient number of the markings 164 are present within a field of view of the camera 130-2, a pose of the aerial vehicle 110 with respect to the docking station 160 may be calculated according to a perspective-n-point algorithm, or in any other manner.

Figure 1F:
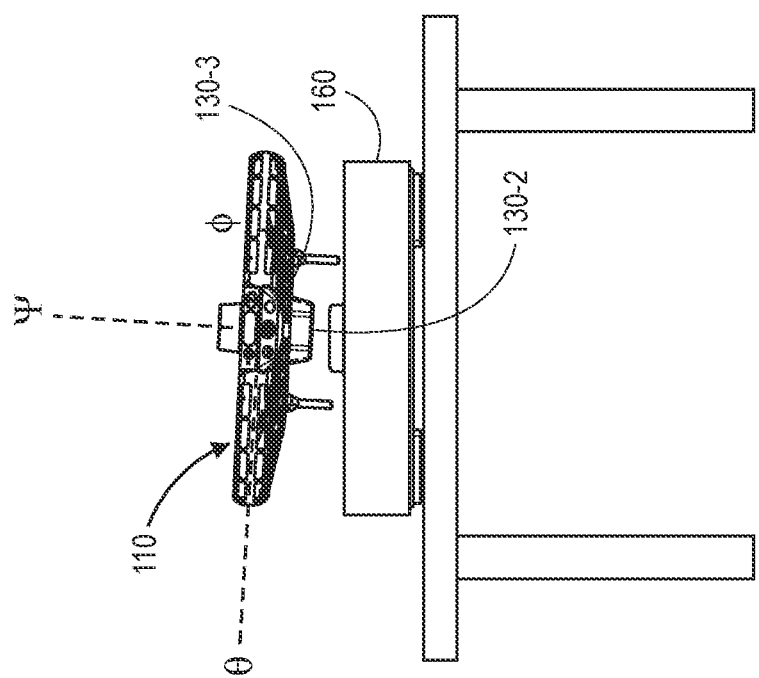

During a descent to the docking station 160, the aerial vehicle 110 may execute one or more maneuvers, e.g., to reposition the aerial vehicle 110 along or about one or more of the yaw axis $\psi$, the pitch axis $\phi$ and the roll axis $\theta$, and cause the aerial vehicle 110 to be properly oriented with respect to the markers 164 and the frame 166. As is shown in FIG. 1F, the aerial vehicle 110 may continue a descent until the aerial vehicle 110 is sufficiently close to the docking station 160, and may determine poses with respect to the docking station 160 based on data captured using the camera 130-2, the range sensor 130-3, and any number of inertial sensors as the aerial vehicle 110 continues the descent to the docking station 160.

Figure 1G:
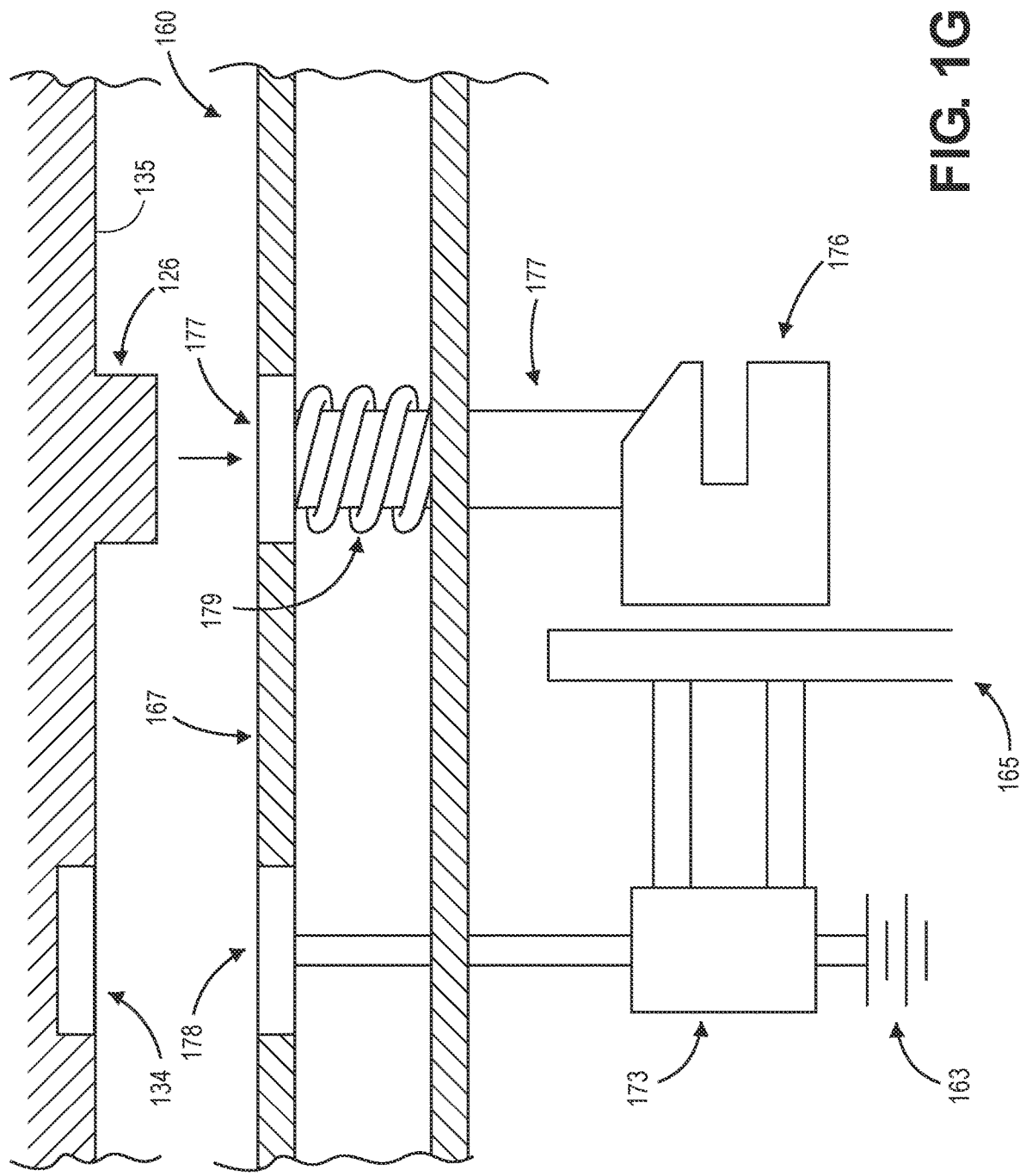

As is shown in FIG. 1G, with the aerial vehicle 110 properly positioned and aligned with respect to the docking station 160, the extension 126 provided on the surface 135 of the underside of the aerial vehicle 110 is positioned directly above and properly aligned with the movable member 177 on the surface 167 of the frame 166. When the aerial vehicle 110 has not yet docked in the docking station 160, and the extension 126 has not depressed the upper surface of the movable member 177 into the housing 170, the sensor trigger 165 remains in the first state, during which transmission and receipt of light by the photointerrupter module 176 is not blocked, and the switch 173 for supplying electrical power to the contact 178 remains open.

Figure 1I:
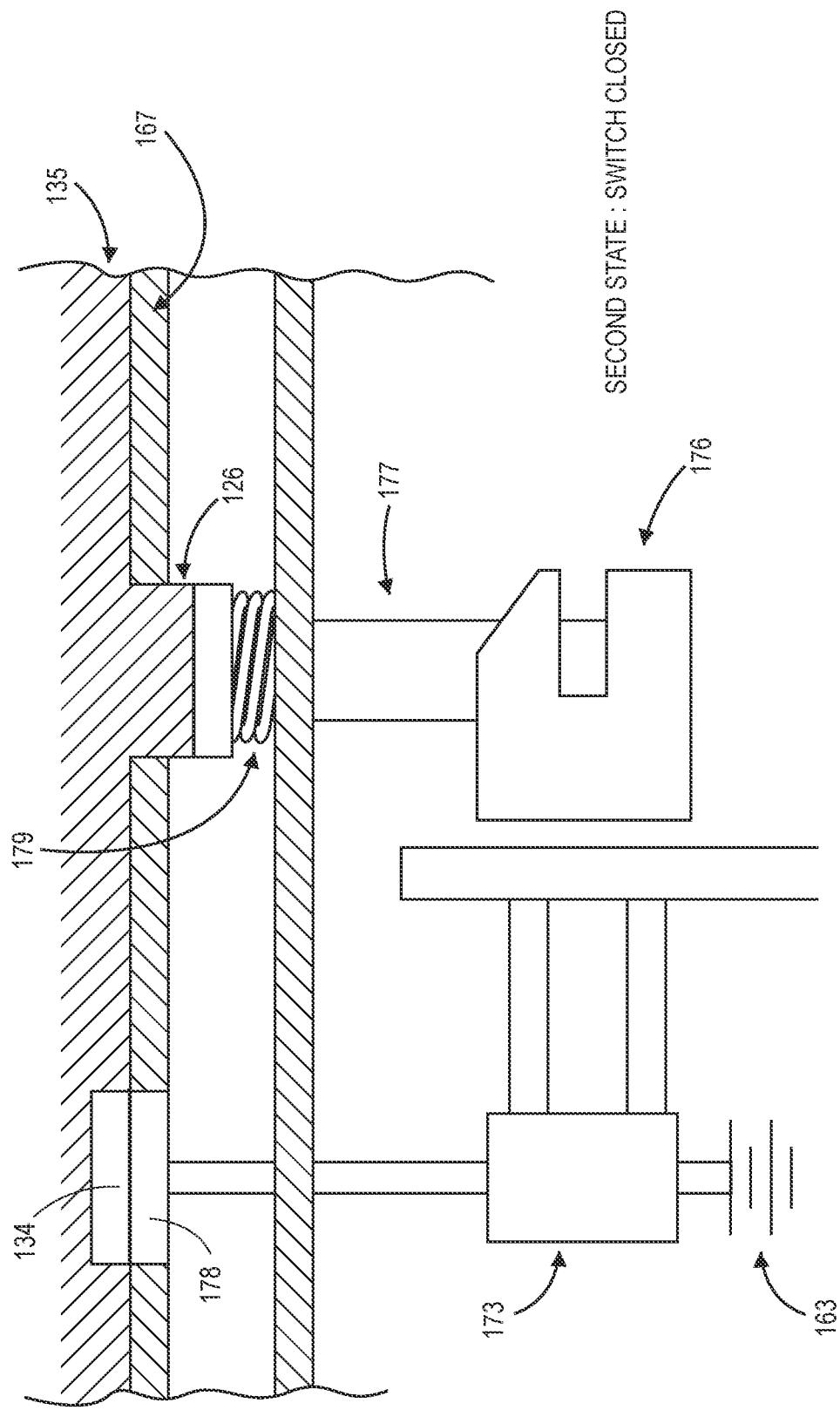

As is shown in FIG. 1H, the aerial vehicle 110 completes its descent and docks on the docking station 160, e.g., by isolating power to or otherwise turning off the propulsion motors of the aerial vehicle 110, thereby causing the aerial vehicle 110 to lower onto the docking station 160. As is shown in FIG. 1I, with the aerial vehicle 110 docked on the docking station 160, the extension 126 depresses the movable member 177 into the housing 170, thereby compressing the spring 179 and causing the blade-like lower extension of the movable member 177 to enter the slot or other opening of the photointerrupter module 176 and act as a shield to block the transmission and receipt of light by the photointerrupter module 176. Additionally, and also with the aerial vehicle 110 docked on the docking station 160, the contact 134 provided on the surface 135 of the underside of the aerial vehicle 110 contacts the contact 178 provided on the surface 167 of the docking station 160.

With the blade-like lower extension of the movable member 177 within the slot of the photointerrupter module 176, and the transmission and receipt of light by the photointerrupter module 176 blocked, the sensor trigger 165 transitions from the first state shown in FIG. 1C to a second state. In the second state, the switch 173 is closed, and the contact 178 is energized by the power source 163, thereby causing electrical power to be transferred to the aerial vehicle 110 by the docking station 160. Subsequently, when the aerial vehicle 110 departs from the docking station 160, the extension 126 lifts from the upper surface of the movable member 177, which is biased by the spring 179 to return to the position shown in FIG. 1G. The blade-like extension of the movable member 177 is thus removed from the slot or other opening of the photointerrupter module 176, enabling the transmission and receipt of light by the photointerrupter module 176, and opening the switch to terminate the supply of electrical power to the aerial vehicle 110.

In some implementations, the sensor trigger 165 may include any other type or form of sensor, such as a Hall effect sensor, a proximity sensor, or any other sensor that may detect a change in position of the movable member 177, and cause a change in state of the sensor trigger 165 accordingly.

Aerial vehicles of the present disclosure may be utilized or configured for any number or type of missions or operations. In some implementations, aerial vehicles of the present disclosure may be programmed or configured to generate one or more environment maps of indoor spaces within a facility, based on images or other data captured by one or more sensors. An environment map may identify or depict one or more boundaries (e.g., walls, ceilings, floors) or other aspects of indoor spaces, as well as the respective dimensions of such spaces, or the respective surfaces or textures of such boundaries. In some embodiments, an aerial vehicle may autonomously travel throughout an indoor space in order to capture data using one or more sensors, and such data may be utilized in generating an environment map of the indoor space. Additionally, an environment map generated based on data captured using one or more sensors of an aerial vehicle may further include one or more layers identifying locations of utilities, services or other systems within an indoor space.

Aerial vehicles of the present disclosure may be configured to operate any access-related systems within an indoor space, including any portals or other systems, or to enable communication with persons within an indoor space via one or more communications channels (e.g., voice, video and/or data). In some embodiments, an aerial vehicle may be programmed or instructed to automatically open a door or other entry point in a home, an office or another structure (e.g., a private dwelling or business location), to access a garage or other parking or standing area, or to activate an indication within an indoor space. For example, an aerial vehicle may be configured to transmit wireless codes, signals or other information to trigger a response from one or more devices or machines equipped with wireless transceivers, such as garage door openers, doorbells, lights, haptic feedback systems or other machines or devices. Aerial vehicles may also be configured to share any relevant information or data with persons, while preventing such persons from accessing any other sensitive information or data within the indoor space. Aerial vehicles may be further configured to communicate with any other vehicles or systems within an indoor space, including but not limited to cleaning robots, servicing robots, domestic robots, household robots, monitoring and/or surveillance robots, or robots of any other kind, e.g., to provide one or more instructions for performing one or more tasks within the indoor space.

In some embodiments, an aerial vehicle may include one or more cameras or other optical sensors having fields of view that extend below the aerial vehicle and are aligned to capture imaging data while the aerial vehicle executes one or more landing evolutions. Thus, when the portion of the aerial vehicle attempts to land on a docking station or at another location, such cameras or other optical sensors may be used to guide the aerial vehicle onto the docking station or another landing surface.

Moreover, aerial vehicles of the present disclosure may be configured for use or operation within indoor spaces or facilities of any kind. As used herein, the term "facility" shall refer to any building, region, structure or other space (e.g., covered or uncovered), such as a home of any type, kind, shape or form, including but not limited to a house, an apartment, a condominium, a dormitory, a barracks, or any other defined or undefined structure having one or more living spaces. A facility may also be a business-related structure such as a building, an office, a shopping center, a restaurant, a post office, a grocery store, a department store, a materials handling facility, or any other defined or undefined structure having one or more commercial areas. A facility may also be any other type of facility including but not limited to stadiums, ballfields, transportation centers or financial institutions (e.g., banks).

In some implementations, the aerial vehicles of the present disclosure may be dispatched or otherwise instructed to travel to one or more locations, to capture images or other data in such locations, and to determine whether a predetermined event or condition (e.g., an alarm event or condition) is occurring or has occurred at the one or more locations. In some embodiments, the aerial vehicles may be dispatched or instructed to travel to such locations directly, e.g., in response to one or more sets of instructions received from an external computer device over one or more networks.

The aerial vehicles of the present disclosure may take any action in response to determining that one or more sensors has detected a predetermined event or condition, or upon processing or otherwise analyzing data captured from one or more spaces within a facility. For example, an aerial vehicle may affirmatively determine, e.g., to various levels of confidence, that a predetermined event or condition has occurred in one or more spaces within a facility or, alternatively, that the predetermined event or condition has not occurred in such spaces. Alternatively, the aerial vehicles of the present disclosure may transmit images or other data captured from such spaces to one or more external computer devices or systems, such as a base component or other station configured to charge the aerial vehicles with electrical power (e.g., a base component, a charging dock, or another intermediary device or system) within the facility or, alternatively, to a server or other computer device or system provided in one or more alternate or virtual locations, e.g., in a "cloud"-based environment. The images or other data may be transmitted independently or along with one or more measures of a level of confidence (e.g., a confidence score) as to whether a predetermined event or condition has occurred or is present within the one or more spaces.

Subsequently, the external computer device or system may make a determination, based on the images or other data, or any other data captured by one or more sensors present within such spaces or in any other location, whether a predetermined event or condition has occurred or is present within such spaces, or whether the predetermined event or condition has not occurred or is not present in such spaces.

Aerial vehicles of the present disclosure may be configured to operate along with one or more docking stations, e.g., base components, charging docks (or charging stations or docking stations), or other intermediary devices. Such stations may have openings, cavities or spaces configured to accommodate one or more portions of an aerial vehicle, and may include one or more surfaces that are aligned to come into contact with corresponding surfaces of the aerial vehicle, thereby enabling electrical power, information or data to be conveyed between the aerial vehicle and such stations. In some embodiments, a base component, a charging dock, or another intermediary device may include an opening, a cavity or another space that is sized and shaped to receive or accommodate a specific portion of an aerial vehicle, e.g., a fuselage of the aerial vehicle, and to enable the aerial vehicle to be aligned in one of a plurality of alignments or orientations with respect to the base component, the charging dock or intermediary device.

For example, in some embodiments, an aerial vehicle may also include one or more contacts (or connectors, e.g., charging contacts or charging connectors) that are positioned or aligned in an arrangement or pattern on an external surface of a portion of the aerial vehicle, e.g., a fuselage of the aerial vehicle, that is designed to contact corresponding portions of a docking station or another intermediary device. One or more internal surfaces of the docking station may include contacts (or connectors, e.g., charging contacts or charging connectors) that are positioned or aligned in an arrangement or pattern that is consistent with arrangements or patterns of contacts on external surfaces of an aerial vehicle, such that the contacts on the external surface of the portion of the aerial vehicle and the contacts on the one or more internal surfaces of the docking station mate or otherwise come into contact with one another when the portion of the aerial vehicle is in one of a plurality of predetermined alignments or orientations. Docking stations of the present disclosure further include one or more sensor triggers for detecting the presence or absence of an aerial vehicle thereon. The sensor triggers may be configured to operate in one of any number of states based on a sensed position of a movable member or an insertable or depressible element, including at least one state in which a contact within a cavity or depression of the docking station is energized, and at least one state in which the contact is deenergized. The docking station may include circuitry configured to cause the contact to be energized or deenergized based on states of the sensor triggers.

Figure 2:
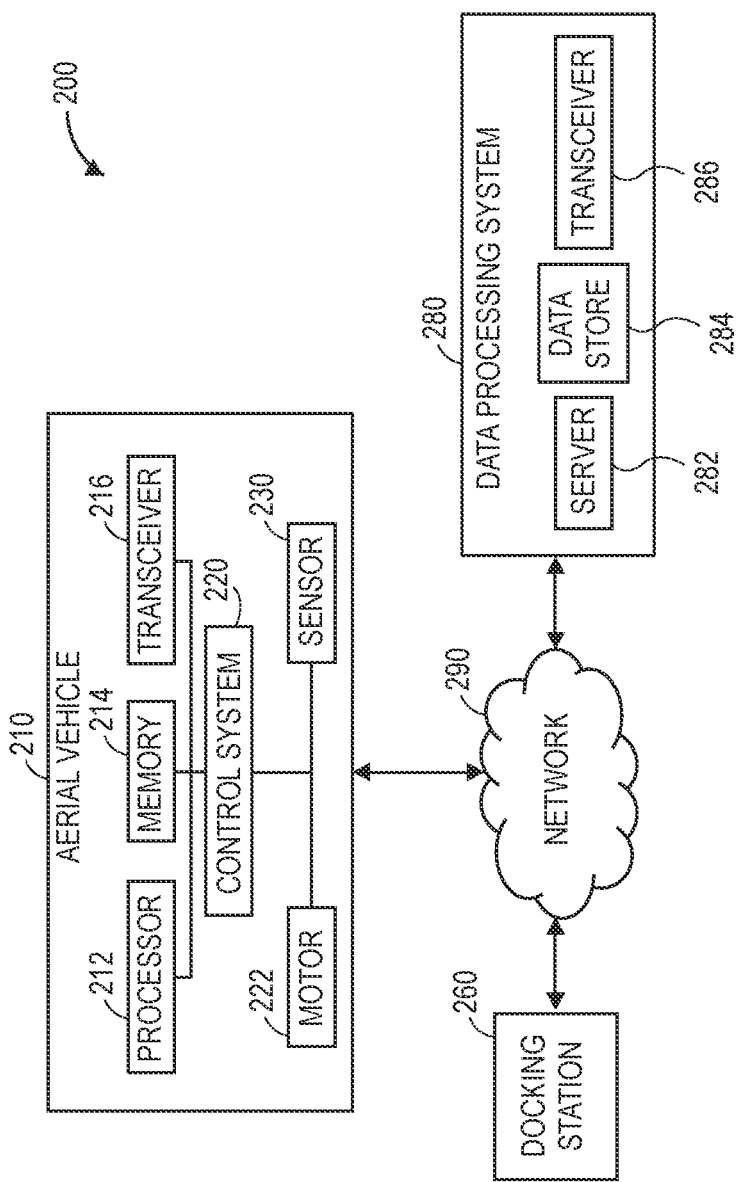
FIG. 2 is a block diagram of one system including an aerial vehicle and a docking station in accordance with embodiments of the present disclosure.

Referring to FIG. 2, a block diagram of components of one system including an aerial vehicle and a docking station in accordance with embodiments of the present disclosure is shown. The system 200 includes the aerial vehicle 210, a docking station 260 and a data processing system 280 that are connected to one another across a network 290, which may include the Internet in whole or in part. Except where otherwise noted, reference numerals preceded by the number "2" shown in FIG. 2 refer to elements that are similar to elements having reference numerals preceded by the number "1" shown in FIGS. 1A through 1I.

The aerial vehicle 210 may be any type or form of aerial vehicle (e.g., an unmanned aerial vehicle, or drone) that may be programmed or configured to autonomously perform one or more operations within indoor spaces of a facility. As is shown in FIG. 2, the aerial vehicle 210 includes a processor 212, a memory 214 and a transceiver 216. The aerial vehicle 210 further includes a control system 220, one or more motors 222, and one or more sensors 230.

The processor 212 may be configured to perform any type or form of computing function associated with the operation of the aerial vehicle 210. For example, the processor 212 may be configured to execute any other algorithms or techniques (e.g., machine learning systems or techniques) associated with one or more applications, purposes or functions, such as navigation, monitoring or collision avoidance, or to select at least one of a course, a speed or an altitude for the safe operation of the aerial vehicle 210. The processor 212 may be configured to control any aspects of the operation of the aerial vehicle 210 and any computer-based components thereon, including but not limited to the motors 222 or the sensors 230. For example, the processor 212 may control the operation of one or more control systems or modules, such as the control system 220, for generating instructions for conducting operations of one or more of the motors 222 or the sensors 230. Such control systems or modules may be associated with one or more other computing devices or machines, and may communicate with the docking station 260, the data processing system 280 or one or more other computer devices over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, paths or routes, control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), non-volatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols or standards such as Bluetooth or any Wi-Fi protocol, over the network 290 or directly. The transceiver 216 may further include or be in communication with one or more input/output (or "I/O") interfaces, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the control system 220, or the motors 222 or sensors 230. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (or "PCI") bus standard or the Universal Serial Bus (or "USB") standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the aerial vehicle 210 and for engaging with or releasing items, as desired. For example, the control system 220 may be configured to cause or control the operation of one or more of the motors 222, e.g., to cause one or more of the motors 222 to operate at desired speeds, in order to guide the aerial vehicle 210 along a desired course, at a desired speed, or at a desired altitude, as appropriate. The control system 220 may further control any other aspects of the aerial vehicle 210, including but not limited to the operation of one or more steering or braking systems of an aerial vehicle, or one or more control surfaces such as wings, rudders, flaperons, elevons, elevators, ailerons, flaps, brakes or slats of an aerial vehicle, within desired ranges. In some embodiments, the control system 220 may be integrated with one or more of the processor 212, the memory 214 and/or the transceiver 216.

The motors 222 may be any type or form of motor (e.g., electric, gasoline-powered or any other type of motor) capable of generating sufficient rotational speeds of one or more propellers or other components to provide thrust and/or lift forces to the aerial vehicle 210 and any payload engaged thereby. In some embodiments, one or more of the motors 222 may be a brushless direct current ("DC") multi-phase motor such as an outrunner brushless motor or an inrunner brushless motor.

The aerial vehicle 210 may include any number of such motors 222 of any kind. For example, one or more of the motors 222 may be aligned or configured to operate with different capacities or ratings, or at different speeds, or coupled to any number of propellers having different sizes and shapes. Additionally, one or more of the motors 222 may be an electric motor, e.g., a brushless DC multi-phase motor, and one or more of the motors 222 may be a gasoline-powered motor.

The aerial vehicle 210 may also include any number of sensors 230 or other components or other features for capturing data within a vicinity of the aerial vehicle 210, including but not limited to one or more imaging devices (e.g., cameras, such as visual cameras, depth cameras, infrared cameras, or others), range sensors (e.g., LIDAR sensors, time-of-flight sensors, ultrasonic sensors, or others), radiofrequency transceivers or receivers, Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors (e.g., microphones, piezoelectric sensors, vibration sensors or other transducers for detecting and recording acoustic energy from one or more directions). For example, in some implementations, the aerial vehicle 210 may include two or more of such sensors 230 in an IMU or any other system. Furthermore, in some implementations, one or more of the sensors 230 may have fields of view or other orientations or configurations that enable the aerial vehicle 210 to capture information or data from below the aerial vehicle 210, or in any other direction with respect to the aerial vehicle 210. For example, in some implementations, the aerial vehicle 210 may include one or more cameras that are aligned to capture imaging data from fields of view extending below the aerial vehicle 210, and along or parallel to a yaw axis of the aerial vehicle 210. Alternatively, the aerial vehicle 210 may include one or more cameras that are aligned to capture imaging data from fields of view extending laterally with respect to the aerial vehicle 210, e.g., perpendicular to a yaw axis of the aerial vehicle 210, or along or parallel to a pitch axis or a roll axis of the aerial vehicle 210.

Although the block diagram of FIG. 2 includes a single box corresponding to a motor 222 and a single box corresponding to a sensor 230, those of ordinary skill in the pertinent arts will recognize that the aerial vehicle 210 may include any number of motors 222 or sensors 230 in accordance with the present disclosure.

The docking station 260 may be any device or system configured to receive portions of the aerial vehicle 210 therein or thereon, e.g., prior to or following operations of the aerial vehicle 210, and to support weight of the aerial vehicle 210, or provide power or connectivity to the aerial vehicle 210. The docking station 260 may include frames or housings formed from any suitable materials, as well as contacts (or connectors, e.g., charging contacts or charging connectors) for transferring power or data to or from the aerial vehicle 210. The docking station 260 may be formed from any suitable materials, and may have sizes, shapes or dimensions that are selected based on attributes or features of the aerial vehicle 210, in accordance with any of the implementations described herein. The docking station 260 may further include circuitry configured to a charging contact to be energized or deenergized based on a position of a movable member or an insertable element, e.g., in accordance with a state of a sensor trigger.

In some implementations, the docking station 260 may include one or more transceivers or other components or systems for enabling communication between the aerial vehicle 210, the data processing system 280 or any other systems (not shown). Alternatively, in some other implementations, the docking station 260 need not include any such components or systems.

The data processing system 280 includes one or more physical computer servers 282 having one or more computer processors, one or more data stores (e.g., databases) 284, and any number of transceivers 286 associated therewith, as well as provided for any specific or general purpose. In some embodiments, the data processing system 280 of FIG. 2 may be independently provided for the exclusive purpose of receiving, analyzing or storing information or data received from the aerial vehicle 210 or, alternatively, provided in connection with one or more physical or virtual services configured to receive, analyze or store such information or data, as well as one or more other functions. In some other embodiments, the data processing system 280 may be associated with an electronic marketplace, a fulfillment center, a warehouse, a bricks-and-mortar retail establishment, or any other like facilities. Such facilities may be adapted to receive, store, process and/or distribute items, and may include any number of stations for receiving, storing and distributing items to customers, including but not limited to one or more receiving stations, storage areas and/or distribution stations, which may further include any number of associated servers, data stores, processors or like computer components. Alternatively, or additionally, in some embodiments, the data processing system 280 may be associated with any number of public or private authorities, such as police, fire or security personnel.

The servers 282 may be connected to or otherwise communicate with the data stores 284 and the transceivers 286, and may receive, analyze or store any type of information or data, e.g., imaging data, acoustic signals, environmental conditions, operational characteristics, or positions, or any other information or data, for any purpose. The servers 282 and/or the data stores 284 may also connect to or otherwise communicate with the network 290, through the sending and receiving of digital data. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more vehicles, including but not limited to the aerial vehicle 210.

Each of the transceivers 216, 286 or other communications devices, systems or components may be configured to communicate through one or more wired or wireless means, e.g., wired technologies such as Universal Serial Bus (or "USB") or fiber optic cable, or wireless standards or protocols such as Bluetooth or any Wi-Fi protocol, over the network 290 or directly. The transceivers 216, 286 may further include or be in communication with one or more I/O interfaces, network interfaces or devices, and may be configured to allow information or data to be exchanged between one another, or to or from one or more other computer devices or systems via the network 290.

The transceivers 216, 286 may perform any necessary protocol, timing or other data transformations in order to convert data signals from a first format suitable for use by one component into a second format suitable for use by another component. For example, in some embodiments, the transceivers 216, 286 may be configured to communicate according to one or more protocols traditionally associated with discrete components, e.g., within specific frequency spectra, including but not limited to radio frequency signals typically within ranges of approximately three hundred to four hundred megahertz, or 300-400 MHz, as well as radio frequency signals typically within ranges of approximately three hundred to five hundred megahertz, or 300-500 MHz.

In some embodiments, the transceivers 216, 286 may be configured to transmit or receive Bluetooth signals sent within an industrial, scientific and medical (ISM) radio frequency range of approximately 2.400 to approximately 2.500 gigahertz (GHz), with a center frequency of approximately 2.450 GHz. Such signals are typically sent within a particular range of approximately 2.402 to approximately 2.480 GHz, and have a maximum transmission rate on Bluetooth networks of 3 megabits per second (or 3 Mbps) or more, with a maximum transmission range of 10 to 100 meters or more, and at powers of approximately one milliwatt (mW), or 0.001 watts (W). The transceivers 216, 286 may operate according to a frequency-hopping spread spectrum (FHSS) method, e.g., by switching carriers across multiple frequency channels and transmitting communications in small segments, and in respective time slots. In some embodiments, such communications may be transmitted at approximately 1,600 times per second across 79 different subfrequencies at bandwidths of 0.001 GHz, or one megahertz (MHz) across the 2.402 to 2.480 GHz range.

In some embodiments, the transceivers 216, 286 may be configured to transmit or receive Ultra-Wide Band (or "UWB") signals over one or more broad spectrums within any radio frequency range. In some embodiments, the UWB signals may be transmitted and/or received over a range of approximately three to eleven gigahertz (GHz), or over a range of approximately four to six gigahertz (GHz), with a center frequency of approximately five gigahertz (GHz). Alternatively, the UWB signals may be transmitted over any frequency range, and with any center frequency. Additionally, the UWB signals may consist of billions of pluses transmitted across such frequency spectrums, and at various power levels or power densities.

In some embodiments, the transceivers 216, 286 may be configured to transmit or receive RFID signals at low frequency (LF), medium frequency (MF) or high frequency (HF) levels (e.g., approximately 3 kilohertz to 30 megahertz, or 3 kHz-30 MHz) and transfer relatively small-sized sets or packets of data over short ranges (e.g., between one and one hundred centimeters, or 1-100 cm). In some other embodiments, the transceivers 216, 286 may be configured to transmit or receive RFID signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

Alternatively, the transceivers 216, 286 may be configured to communicate within customized frequency spectra, or at dynamic frequencies, in accordance with the present disclosure. For example, in some embodiments, one or more of the transceivers 216, 286 may be configured to communicate according to a proprietary standard or protocol, or within a proprietary frequency spectrum.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein. Any combination of networks or communications protocols may be utilized in accordance with the systems and methods of the present disclosure. For example, the various components described herein may be configured to communicate via an open or standard protocol such as Wi-Fi. Alternatively, such components may be configured to communicate with one another directly outside of a centralized network, such as the network 290, e.g., by a wireless protocol such as Bluetooth, in which two or more of such components may be paired with one another.

The computers, servers, devices and the like described herein have the necessary electronics, software, memory, storage, databases, firmware, logic/state machines, microprocessors, communication links, displays or other visual or audio user interfaces, printing devices, and any other I/O devices to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the docking station 260 and/or the data processing system 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the aerial vehicle 210, the docking station 260 and/or the data processing system 280 may be adapted to transmit information or data in the form of synchronous or asynchronous messages between or among themselves, or between or among any other computer device in real time or in near-real time, or in one or more offline processes, via the network 290. Those of ordinary skill in the pertinent arts would recognize that the aerial vehicle 210, the docking station 260 and/or the data processing system 280 may operate any of a number of computing devices that are capable of communicating over the network, including but not limited to set-top boxes, personal digital assistants, digital media players, web pads, desktop computers, laptop computers, tablet computers, smartphones, smart speakers, wrist watches, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors 212 and/or the data processing system 280, or any other computers or control systems, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
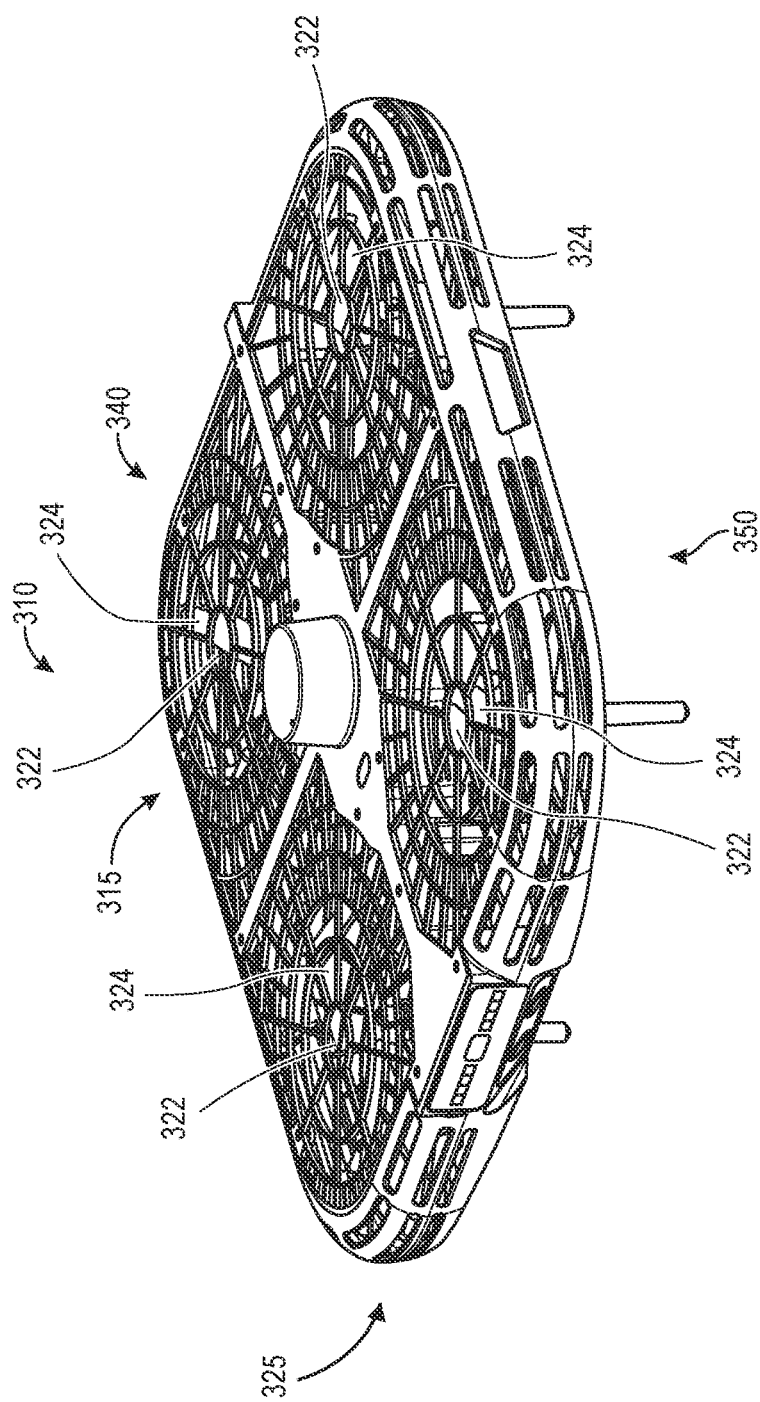
FIGS. 3A and 3B are views of aspects of one aerial vehicle in accordance with embodiments of the present disclosure.
Figure 3B:
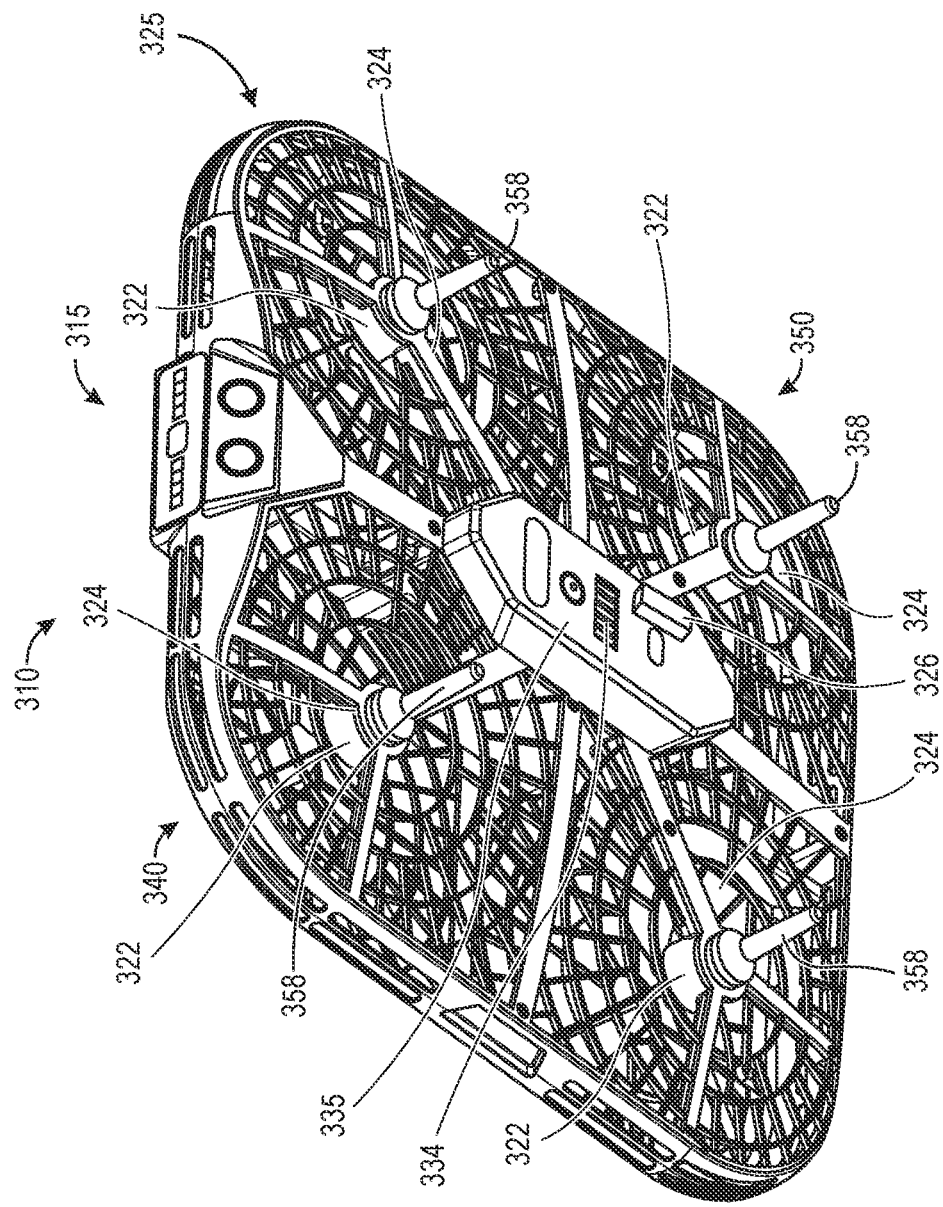

Referring to FIGS. 3A and 3B, a view of an aerial vehicle in accordance with embodiments of the present disclosure is shown. Except where otherwise noted, reference numerals preceded by the number "3" shown in FIG. 3A or 3B refer to elements that are similar to elements having reference numerals preceded by the number "2" shown in FIG. 2 or by the number "1" shown in FIGS. 1A through 1I.

As is shown in FIGS. 3A and 3B, an aerial vehicle 310 includes a housing 315 formed from a shroud (or a side section) 325, an upper section 340 and a lower section 350. As is shown in FIG. 3A, the upper section 340 includes an upper frame and plurality of upper mesh sections, each including an inner ring defining a central opening and a plurality of spokes extending radially outward from the central opening, as well as a plurality of other concentric rings having radii that are progressively larger than the central opening. The inner rings of the upper mesh sections defining the central openings, the spokes or the other concentric rings may have cross-sections of any other shape or size, e.g., squares, rectangles, circles or others, and may have any dimensions, such as widths or diameters of one to two millimeters (1-2 mm) each, and any lengths. Moreover, the central openings and the other concentric rings of the upper mesh sections may have any radii or diameters. For example, in some implementations, the central openings may have diameters of approximately one to two centimeters (1-2 cm), and the concentric rings may have progressively larger diameters, e.g., approximately nine to ten millimeters (9-10 mm) from the inner rings defining the central openings or one another in a radial direction. The spokes of the upper mesh sections may have any angular separations from one another, e.g., forty-five degrees, or any fraction thereof, e.g., one-fourth of forty-five degrees.

As is shown in FIG. 3B, the lower section 350 also includes a lower frame, and a plurality of lower mesh sections (or lower meshes) mounted to the lower frame, as well as a plurality of landing pegs (or landing struts, or landing feet) 358. As is further shown in FIG. 3B, the lower mesh sections may each be defined by a radially oriented lattice structure that includes a central opening defined by an inner ring or another circular object. Each of the lower mesh sections further includes a plurality of spokes extending radially outward from the central openings, as well as a plurality of other concentric rings having radii that are progressively larger than the central openings. The inner rings of the lower mesh sections defining the central openings, the spokes or the other concentric rings may have cross-sections of any other shape or size, e.g., squares, rectangles, circles or others, and may have any dimensions, such as widths or diameters of one to two millimeters each, and any lengths. Moreover, the central openings and the other concentric rings of the lower mesh sections may have any radii or diameters. For example, in some implementations, the central openings may have diameters of approximately two to four centimeters (2-4 cm), and the concentric rings may have progressively larger diameters, e.g., approximately nine to ten millimeters (9-10 mm) from the inner rings defining the central opening or one another in a radial direction. The spokes of the lower mesh sections may have any angular separation from one another, e.g., forty-five degrees, or any fraction thereof, e.g., one-fourth of forty-five degrees.

As is further shown in FIG. 3B, a rib-like extension (or rib) 326 extends below a substantially flat surface 335 on the underside of the housing 315 of the aerial vehicle 310 that also includes one or more charging contacts 334 (or connectors, or other features) for mating with corresponding contacts (or connectors) of a docking station, as well as any number of cameras or other sensors. The charging contacts 334 enable electrical power, information or data to be conveyed between the aerial vehicle 310 and the docking station. The extension 326 has a substantially rectangularly solid shape and is provided in an eccentric location and orientation with respect to the yaw axis of the aerial vehicle 310. For example, as is shown in FIG. 3B, the extension 326 is aligned parallel to the roll axis of the aerial vehicle 310, and perpendicular to the pitch axis of the aerial vehicle 310, and is set off at a predetermined distance from the yaw axis of the aerial vehicle 310. The charging contacts 334 may be provided at any location on the surface 335, including a central location with respect to the yaw axis of the aerial vehicle 310, such as is shown in FIG. 3B, or an eccentric location with respect to the yaw axis of the aerial vehicle 310.

As is also shown in FIG. 3B, the landing pegs 358 extend farther below the surface 335 on the underside of the housing 315 than the extension 326, and include ends or tips that are aligned in a common plane. In some implementations, when the aerial vehicle 310 lands on a substantially flat surface, the landing pegs 358 come into contact with the substantially flat surface. In some other implementations, however, the aerial vehicle 310 may land on or dock in a docking station having an elevated surface within a depression for receiving the aerial vehicle 310, as well as a sensor trigger having one or more movable members or insertable elements and one or more charging contacts for initiating transfer of electrical power to the aerial vehicle 310 by way of the charging contacts 334, and one or more sensors disposed proximate the movable members or insertable elements. In such implementations, the extension 326 may come into contact with the sensor trigger, and the charging contact 334 may come into contact with a corresponding charging contact of the docking station. Where the extension 326 causes a movable member or an insertable element to be depressed into the docking station, a state of the sensor trigger changes, and the transfer of electrical power to the aerial vehicle 310 is initiated by way of the charging contacts 334.

As is shown in FIGS. 3A and 3B, the upper section 340 includes four upper mesh sections, each of which is provided above one of the propulsion motors 322. The lower section 350 includes four lower mesh sections, each of which is provided below one of the propulsion motors 322, and joined or otherwise mounted to the lower frame or arms of a chamber to which the propulsion motors 322 are mounted. As is further shown in FIG. 3A, the central openings of each of the upper mesh sections are coaxially aligned above one of the propulsion motors 322. As is further shown in FIG. 3B, the central openings of each of the lower mesh sections are coaxially aligned below one of the propulsion motors 322.

As is shown in FIGS. 3A and 3B, the inner rings defining the central openings of each of the lower mesh sections have diameters that are substantially larger than the inner rings defining the central openings of each of the upper mesh sections. For example, the central openings of the lower mesh sections may have diameters of approximately two to four centimeters (2-4 cm), or approximately twice a diameter of the central openings of the upper mesh sections, and the concentric rings of the lower mesh sections may have progressively larger diameters. Likewise, the lower mesh sections may include an increased number of spokes or concentric rings that are closer in proximity to one another at outer portions of such sections. In some implementations, one or more concentric rings of the lower mesh sections may have the same dimensions as corresponding concentric rings of the upper mesh sections.

As is shown in FIG. 3A, the upper mesh sections include central openings aligned with axes of rotation of the motors and the propellers, as well as a first set of openings arranged around the central openings, a second set of openings arranged around the first set of openings, and other sets of openings located radially beyond the second set of openings.

As is shown in FIG. 3B, the lower mesh sections include central openings aligned with axes of rotation of the motors and the propellers, as well as a first set of openings arranged around the central openings, a second set of openings arranged around the first set of openings, and other sets of openings located radially beyond the second set of openings.

The construction of the upper mesh sections and the lower mesh sections of the aerial vehicle 310 may result in improved operation of the motors 322 while enhancing the safety of the aerial vehicle 310. For example, distances between the central openings of the upper mesh sections or the lower mesh sections and the concentric rings arranged around them, may be selected to facilitate airflow proximate the hubs of the propellers 324, as compared to airflow proximate to tips or outer edges of the propellers 324. In some implementations, the larger central openings of the lower mesh sections result in enhanced airflow distribution across propellers 324 near their respective hubs.

Moreover, the propellers 324 may be formed from a single-piece construction, and with rigid blades of fixed dimensions, or, alternatively, may have a foldable construction defined by one or more hinges, such that the propeller 324 may be folded into a reduced length or size when not rotating under power, and may be extended to a full length or size when operating under power. Furthermore, where the propeller 324 has a foldable construction, e.g., with blades having one or more hinges, in the event that an object contacts the propeller 324 during operation, the propeller 324 may deflect or fold in response to contact with the object. Such hinges may be provided at or near a hub of the propeller 324, or at any other location along the blades of the propeller 324.

The inner rings defining the central openings of the upper section 340 and the lower section 350, as well as the spokes and the concentric rings of such sections, may have cross-sections of any shape or size, e.g., squares, rectangles, circles or others, and may have any dimensions, such as widths or diameters of one to one-and-one-half millimeters (1-1.5 mm) each, or any other dimensions, and any lengths. Moreover, the central openings and the other concentric rings of the upper section 340 and the lower section 350 may have any radii or diameters. Furthermore, spaces between the respective spokes or concentric rings of the upper mesh sections or the lower mesh sections may be selected on any basis, such as economy, weight, safety or other factors.

As is further shown in FIG. 3B, the substantially slender construction of the landing pegs 358 serves to limit an extent to which the landing pegs 358 may inhibit airflow distribution across the propellers 324. For example, because proximal ends of each of the landing pegs 358 are mounted directly below one of the respective motors 322, e.g., to a support member of the lower frame, and because the landing pegs 358 neck or narrow from the proximal end to the distal ends of the landing pegs 358, the landing pegs 358 remain clear of areas through which air flows prior to entering the housing 315 through the respective lower mesh sections. Alternatively, the landing pegs 358 may be provided in any location with respect to the respective motors 322 below which the landing pegs 358 are mounted. In some implementations, the aerial vehicle 310 may have a greater number of landing pegs 358 than motors 322, or a lesser number of landing pegs 358 than motors 322.

Figure 4:
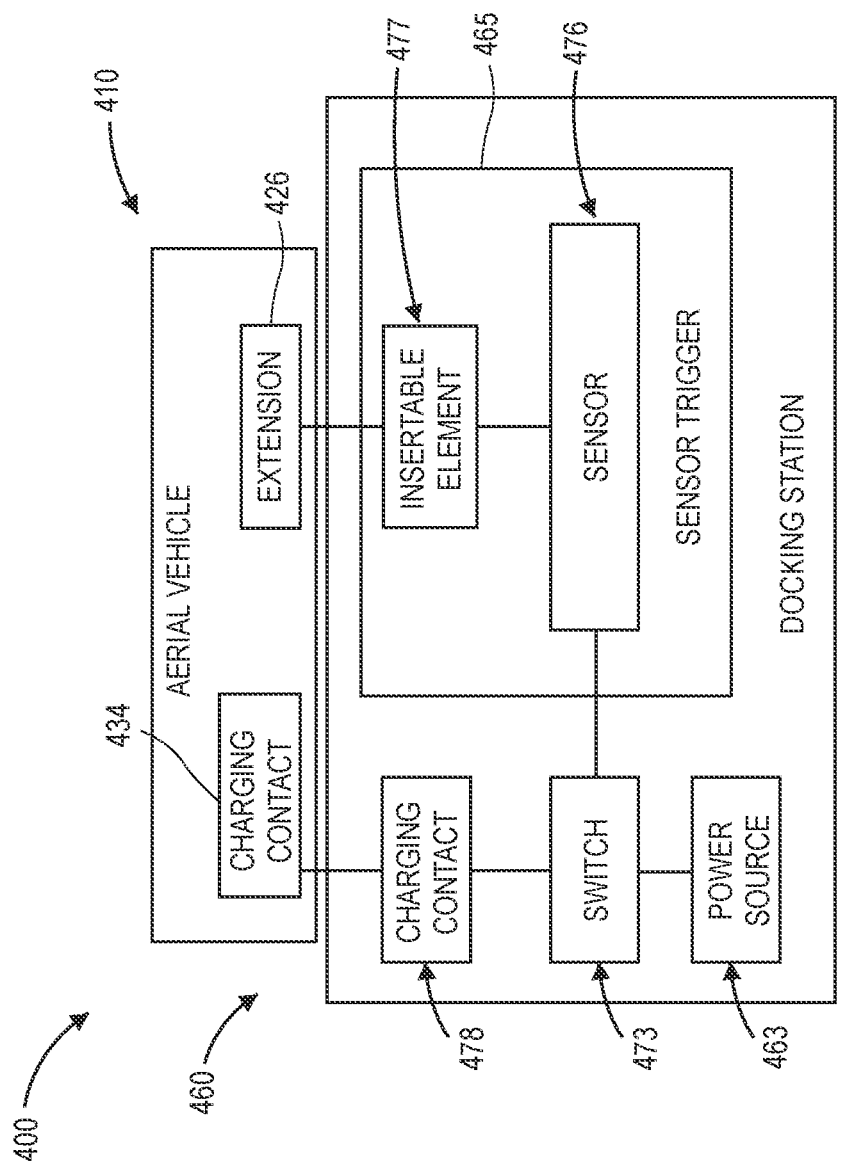
FIG. 4 is a block diagram of one system including an aerial vehicle and a docking station in accordance with embodiments of the present disclosure.

Referring to FIG. 4, a block diagram of components of one system including an aerial vehicle and a docking station in accordance with embodiments of the present disclosure is shown. Except where otherwise noted, reference numerals preceded by the number "4" in FIG. 4 refer to elements that are similar to elements having reference numerals preceded by the number "3" shown in FIG. 3A or 3B, by the number "2" shown in FIG. 2 or by the number "1" shown in FIGS. 1A through 1I.

The system 400 includes an aerial vehicle 410 and a docking station 460. The aerial vehicle 410 includes an extension 426, as well as a charging contact 434 for receiving power from an external source, e.g., the docking station 460. The extension 426 and the charging contact 434 may be provided on one or more surfaces of an underside of the aerial vehicle 410. The docking station 460 includes a power source 463, a switch 473 and a sensor trigger 465 having a sensor 476 and an insertable element (or a movable member) 477 disposed proximate the sensor 476. The docking station 460 may further include circuitry configured to cause the charging contact 434 to be energized or deenergized when the insertable element 477 is in a predetermined position.

The sensor trigger 465 may be configured for operation in any number of states based on a position of the insertable element 477, as determined by the sensor 476. For example, when the sensor trigger 465 is in a first state, the switch 473 may be opened, thereby preventing electrical power from being supplied to the charging contact 478 by the power source 463. When the sensor trigger 465 is in a second state, such as after the sensor 476 has determined that the insertable element 477 has been inserted into a housing of the docking station 460 by at least a predetermined distance, the switch 473 may be closed, thereby causing the charging contact 478 to be energized, and enabling electrical power to be transferred to the aerial vehicle 410 by way of the charging contact 434.

The aerial vehicle 410 may be any vehicle that may be programmed or configured to perform one or more missions by air, e.g., regularly or periodically, or at scheduled or random times. The aerial vehicle 410 may include a housing formed from any number of sections, as well as any number of motors, propellers or other systems within the housing that may be powered by electricity, and configured to generate forces of thrust and/or lift to the aerial vehicle 410 and any payload engaged thereby.

The aerial vehicle 410 may also include any number of landing extensions or other appurtenances extending below the aerial vehicle 410 that enable the aerial vehicle 410 to complete a landing evolution on a docking station or any substantially flat surface. For example, the landing extensions may include pegs, feet or other portions that extend below a lowest point of the housing of the aerial vehicle 410, and are aligned in a common plane.

The extension 426 may be any element (e.g., a rib-like extension) that descends below an underside of a housing or another component of the aerial vehicle 410, but remains above the ends of each of the landing extensions that are aligned within the common plane. The extension 426 may have a cross-section of a predetermined shape and a constant height or depth. The cross-section of the extension 426 may correspond to a cross-sectional area of an upper platform of the insertable element 477, and the height or depth of the extension 426 may correspond to a distance required for a lower flat, blade-like portion or extension of the insertable element 477 (e.g., an extension arm) to be detected by the sensor 476. Meanwhile, the upper platform of the insertable element 477 may be biased into contact with a surface including the charging contact 478 within a depression or other portion of the docking station 460, and the lower portion of the insertable element 477 may extend toward the sensor 476. For example, where the sensor 476 includes a photointerrupter module, the lower portion of the insertable element 477 may be positioned above a slot or another opening of the photointerrupter module, and configured for insertion into or removal from the slot or other opening of the photointerrupter module, to block or enable the transmission and receipt of light across the slot or other opening accordingly. A state of the sensor trigger 465 may be determined based on a position of the insertable element 477, as determined by the sensor 476. For example, when the sensor trigger 465 is in a first state, the switch 473 is open, and the charging contact 478 is deenergized. When the sensor trigger 465 is in a second state, the switch 473 is closed, and the charging contact 478 is energized.

Alternatively, the sensor 476 may include a Hall effect sensor, a proximity sensor, or any other component for detecting a change in a position of a portion of the insertable element 477.

The power source 463 may include one or more batteries or other cells or other elements for storing energy thereon. The power source 463 may be configured to receive electrical energy from an external source, e.g., an alternating current source, by one or more plugs or other connectors, to convert the energy to a usable form or to store the energy thereon, or to transfer the energy to the aerial vehicle 410 by way of the switch 473. For example, the power source 463 may include any number of rectifiers, diodes, capacitors, resistors or other systems for receiving, converting, storing or transferring energy.

The docking station 460 may operate to safely initiate or terminate the transfer of electrical power to the aerial vehicle 410 in the following manner. The aerial vehicle 410 may descend onto the docking station 460 in a predetermined alignment or orientation that causes the extension 426 to come into contact with the upper platform of the insertable element 477 of the sensor trigger 465, thereby further causing the lower portion of the insertable element 477 to descend further into the docking station 460. Upon sensing a change in position of the insertable element 477, the sensor 476 transmits one or more signals to the switch 473, thereby causing the switch 473 to close, and energizing the charging contact 478 to transfer electrical power from the power source 463 to the aerial vehicle 410. Subsequently, when the aerial vehicle 410 departs from the docking station 460, the extension 426 lifts from the upper platform of the insertable element 477, which is biased to lift the lower portion of the insertable element 477 away from the sensor 476, thereby causing the switch 473 to open, and deenergizing the charging contact 478.

In some implementations, portions of the insertable element 477, e.g., the upper platform that is biased into contact with a surface within a depression or other portion of the docking station 460, and the lower portion that is aligned to extend further into a housing of the docking station 460 upon contract with the extension 426 of the aerial vehicle 410, may be formed from any type of plastics, such as low-friction plastics, having desired properties of friction, e.g., nylons, polyethylenes such as polyethylene sulfide, polyethylene terephthalate or other thermoplastics, polyetheretherketones, polytetrafluoroethylenes, or others.

Figure 5A:
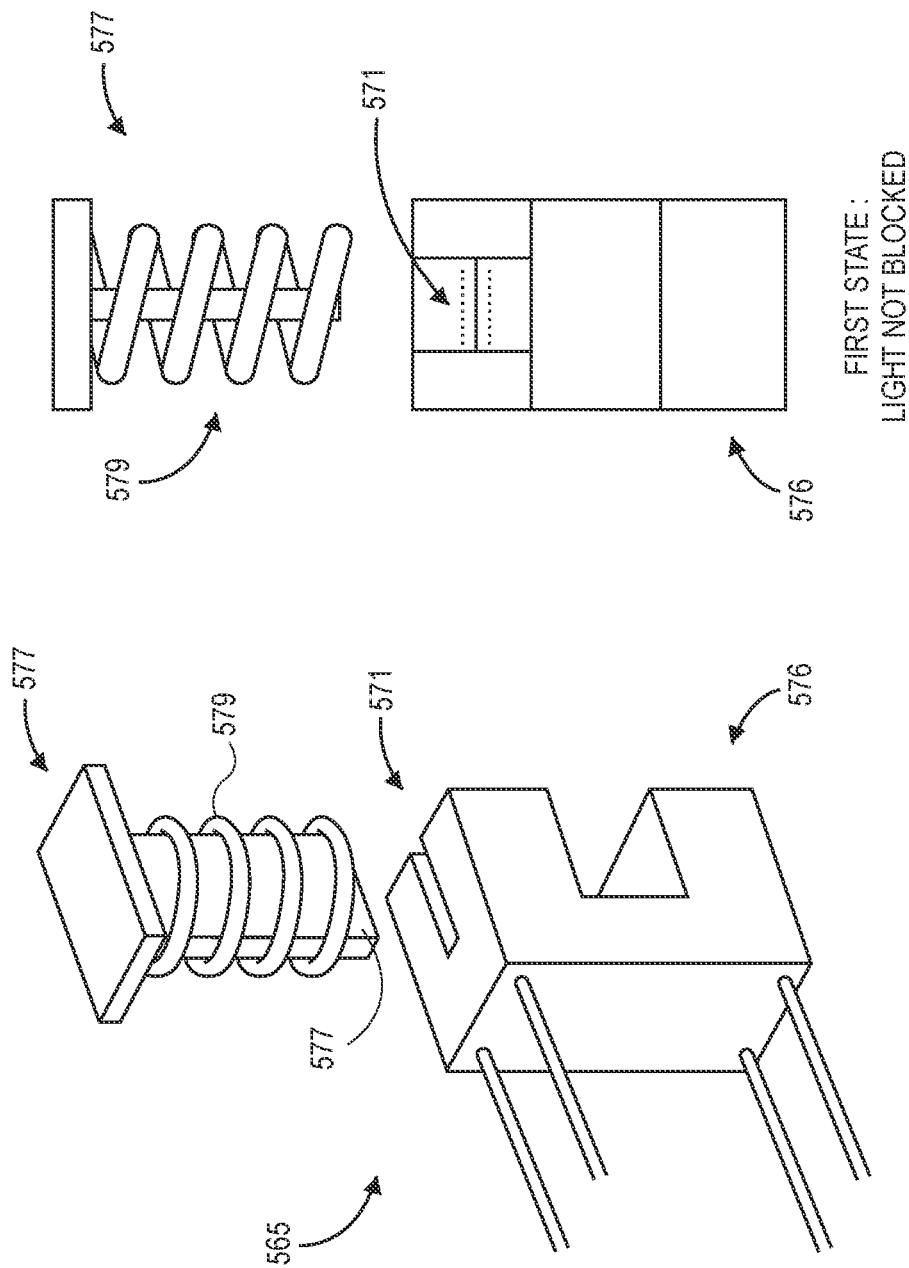
FIGS. 5A and 5B are views of aspects of one system in accordance with implementations of the present disclosure.
Figure 5B:
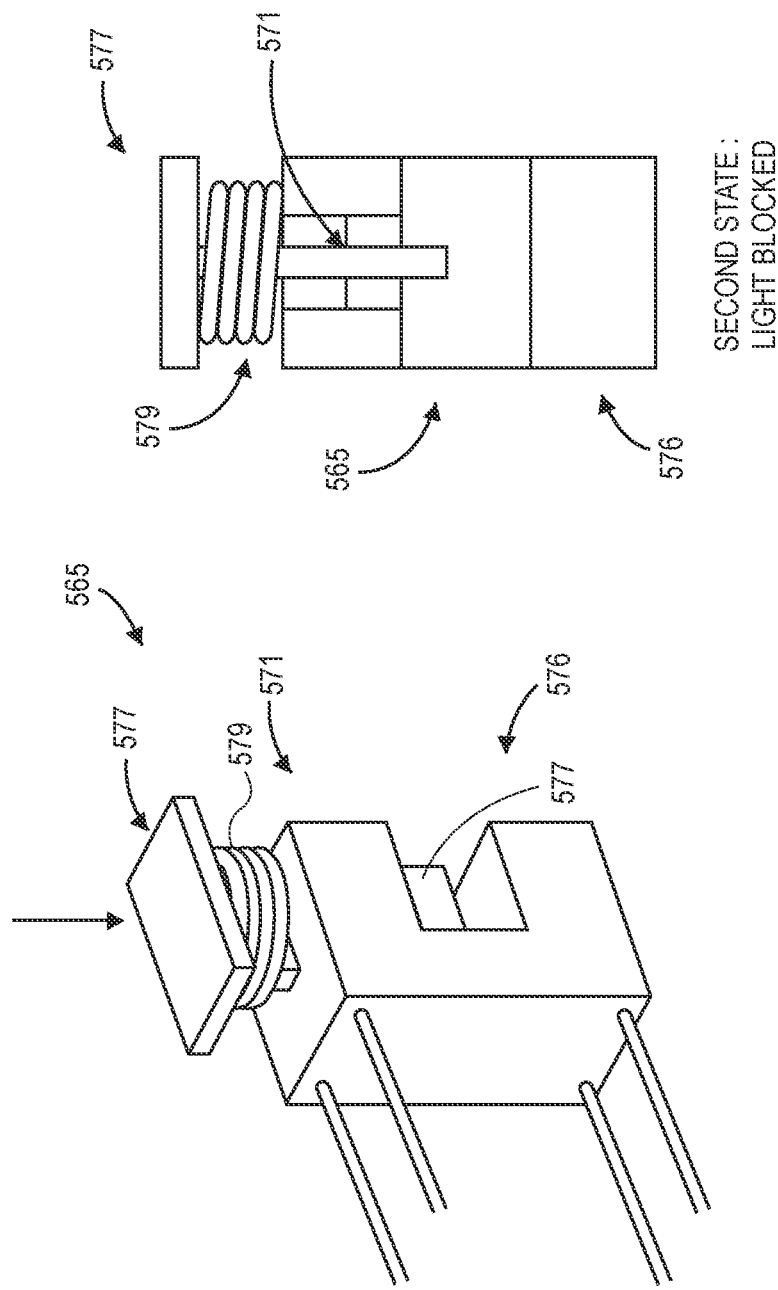

As is discussed above, sensor triggers of the present disclosure may include sensors of any type or form. Referring to FIGS. 5A and 5B, views of aspects of one system in accordance with implementations of the present disclosure are shown. Except where otherwise noted, reference numerals preceded by the number "5" in FIG. 5A or 5B refer to elements that are similar to elements having reference numerals preceded by the number "4" in FIG. 4, by the number "3" shown in FIG. 3A or 3B, by the number "2" shown in FIG. 2 or by the number "1" shown in FIGS. 1A through 1I.

As is shown in FIGS. 5A and 5B, components of a sensor trigger 565 include a movable member (or an insertable element) 577 and a biasing element 579 (e.g., a spring) positioned above a slot or another opening of a photointerrupter module 576 that includes a plurality of light elements 571 for transmitting and receiving light across the slot.

The photointerrupter module 576 may be any type or form of sensor, component or other system that combines elements for transmitting and receiving light into a common frame or housing, and aligns the elements in an opposing manner. The light elements 571 include transmitting elements such as light-emitting diode (or "LED") emitters that emit light when voltages are applied thereto, and receiving elements such as infrared detectors that capture the emitted light and generate electrical signals based on the emitted light.

The movable member 577 includes an upper platform and a lower, substantially flat, blade-like portion (e.g., an extension arm) that is aligned vertically above the slot, and configured to descend into the slot in response to a force supplied by an extension provided on an underside of an aerial vehicle (not shown). As is shown in FIG. 5A, the sensor trigger 565 is in a first state, with the lower portion of the movable member 577 above the slot, thereby enabling the transmission and receipt of light by the light elements 571 across the slot. With the sensor trigger in the first state, the photointerrupter module 576 thus transmits a signal to the switch (not shown), causing the switch to remain open, thereby precluding one or more contacts of a docking station (not shown) from being energized by a power supply of the docking station.

Where the force supplied to the movable member 577 by the extension exceeds a biasing force supplied by the biasing element 579, such as during or following a docking evolution by an aerial vehicle, the lower portion of the movable member 577 descends into the slot, and shields or blocks the transmission and receipt of light by the light elements 571. The sensor trigger 565 thus transitions to a second state, in which the photointerrupter module 576 transmits a signal to a switch (not shown), causing the switch to be closed, the one or more contacts of the docking station (not shown) to be energized, thereby enabling electrical power to be supplied to one or more contacts of the aerial vehicle.

Where the force supplied by the extension falls below the biasing force supplied by the biasing element 579, such as upon a departure by the aerial vehicle, the lower portion of the movable member 577 ascends above the slot, and the transmission and receipt of light by the light elements 571 is no longer shielded or blocked. The sensor trigger 565 thus returns to the first state, in which the photointerrupter module 576 transmits a signal to the switch (not shown), causing the switch to be opened, and terminating the supply of electrical power to the one or more contacts of the docking station (not shown).

Sensor triggers of the present disclosure are not limited to any particular embodiment disclosed herein, and may include sensors that determine positions of insertable elements or cause a change in state of a sensor trigger in any manner. Referring to FIGS. 6A and 6B, views of aspects of one system in accordance with implementations of the present disclosure are shown. Except where otherwise noted, reference numerals preceded by the number "6" in FIG. 6A or 6B refer to elements that are similar to elements having reference numerals preceded by the number "5" in FIG. 5A or 5B, by the number "4" in FIG. 4, by the number "3" shown in FIG. 3A or 3B, by the number "2" shown in FIG. 2 or by the number "1" shown in FIGS. 1A through 1I.

As is shown in FIGS. 6A and 6B, components of a sensor trigger 665 include an insertable element (or movable member) 677A and a biasing element 679 (e.g., a spring). The insertable element 677A is configured for positioning above a slot or another opening of a photointerrupter module that includes a plurality of light elements 671A, 671B for transmitting and receiving light across the slot. The insertable element 677A includes a blade-like lower portion or extension (e.g., an extension arm) having an opening 677B provided therein.

As is shown in FIG. 6A, when the sensor trigger 665 is in a first state, an upper platform of the insertable element 677A is biased in an upward direction, e.g., by the biasing element 679, toward a surface of a depression of a docking station. The transmission of light by a transmitting element 671A to a receiving element 671B is blocked by a lower extension of the insertable element 677A. With the sensor trigger 665 in the first state, as is shown in FIG. 6A, a switch for energizing a charging contact within the depression of the docking station (not shown) remains open.

As is shown in FIG. 6B, when a force exceeding a biasing force supplied by the biasing element 679 is applied to the upper platform of the insertable element 677A, e.g., by an extension provided on an underside of an aerial vehicle, and the insertable element 677A is depressed by at least a predetermined distance, light transmitted by the transmitting element 671A is permitted to pass through the opening 677B in the insertable element 677A to the receiving element 671B. The sensor trigger 665 then transitions to a second state, and the switch for energizing a charging contact within the depression of the docking station (not shown) is closed. Thus, where a corresponding charging contact of an aerial vehicle is in contact with the charging contact within the depression of the docking station that is energized, electrical power is transferred to the aerial vehicle.

Figure 7B:
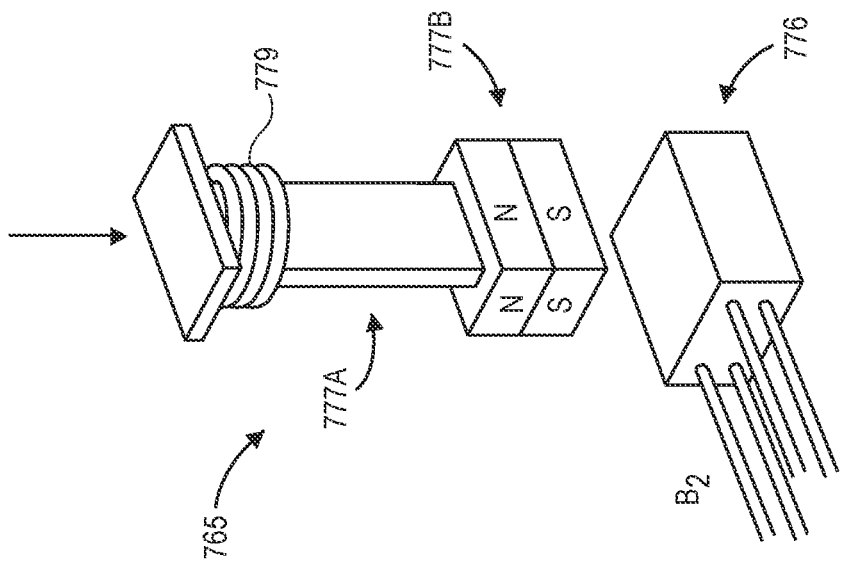
FIGS. 7A and 7B are views of aspects of one system in accordance with implementations of the present disclosure.
Figure 7A:
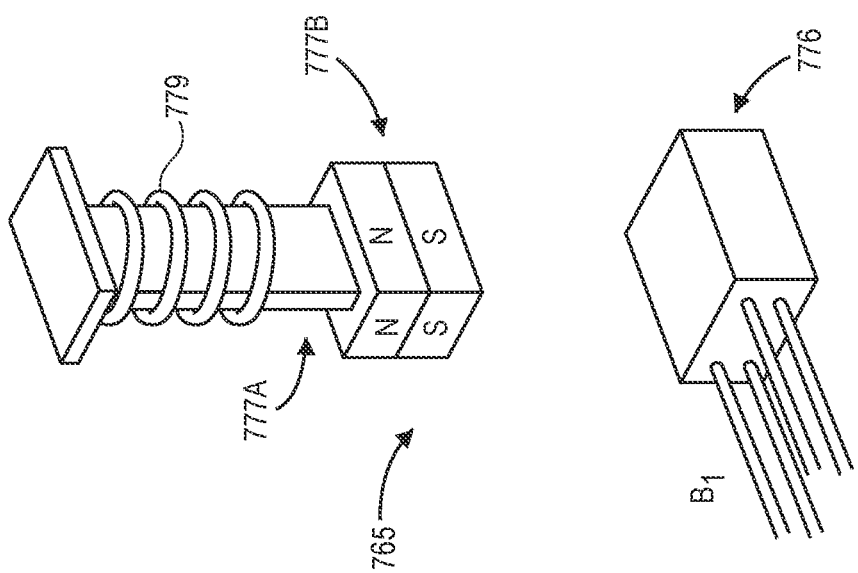

Additionally, any type or form of sensor may be utilized to determine a position of an insertable element or other portion of a sensor trigger, and to cause a change in state of the sensor trigger accordingly. Referring to FIGS. 7A and 7B, views of aspects of one system in accordance with implementations of the present disclosure are shown. Except where otherwise noted, reference numerals preceded by the number "7" in FIG. 7A or 7B refer to elements that are similar to elements having reference numerals preceded by the number "6" in FIG. 6A or 6B, by the number "5" in FIG. 5A or 5B, by the number "4" in FIG. 4, by the number "3" shown in FIG. 3A or 3B, by the number "2" shown in FIG. 2 or by the number "1" shown in FIGS. 1A through 1I.

As is shown in FIGS. 7A and 7B, components of a sensor trigger 765 include a movable member (or an insertable element) 777A, a biasing element 779 (e.g., a spring) and a sensor 776 (e.g., a Hall effect sensor). The movable member 777A includes an upper platform and a lower extension (or extension arm) having a magnet (or magnetic element) 777B provided at a tip of the lower extension.

As is shown in FIG. 7A, when the sensor trigger 765 is in a first state, an upper platform of the movable member 777A is biased in an upward direction, e.g., by the biasing element 779, toward a surface of a depression of a docking station. An intensity of a magnetic field $B_1$ sensed by the sensor 776 is below a predetermined threshold, indicating that the movable member 777A is beyond a predetermined distance from the sensor 776. With the sensor trigger 765 in the first state, as is shown in FIG. 7A, a switch for energizing a charging contact within the depression of the docking station (not shown) remains open.

As is shown in FIG. 7B, when a force exceeding a biasing force supplied by the biasing element 779 is applied to the upper platform of the movable member 777A, e.g., by an extension provided on an underside of an aerial vehicle, and the movable member 777A is depressed by at least a predetermined distance, an intensity of a magnetic field $B_2$ sensed by the sensor 776 is above the predetermined threshold, indicating that the movable member 777A is sufficiently near the sensor 776, or below the depression of the docking station (not shown). The sensor trigger 765 then transitions to a second state, and the switch for energizing a charging contact within the depression of the docking station (not shown) is closed. Thus, where a corresponding charging contact of an aerial vehicle is in contact with the charging contact within the depression of the docking station that is energized, electrical power is transferred to the aerial vehicle.

The contents of U.S. patent application Ser. No. 16/584,721 are incorporated by reference herein in their entirety.

Although some embodiments of the present disclosure show the use of autonomous vehicles in support of one or more applications or functions (e.g., security applications or functions) within indoor spaces of a facility such as a home or a like structure, those of ordinary skill in the pertinent arts will realize that the systems and methods of the present disclosure are not so limited. Rather, the systems and methods of the present disclosure may be utilized in connection with any facility, including but not limited to homes, in support of any type of application or function.

Furthermore, although some of the signals or energy that are described as being transmitted or received by one or more transceivers or other sensors herein have specific labels of protocols, standards or frequency bands (e.g., Wi-Fi or Bluetooth), those of ordinary skill in the pertinent arts will recognize that signals or energy may be transmitted or received by one or more transceivers or other sensors at any frequency or at any intensity level, and according to any protocol or standard, in accordance with embodiments of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising an aerial vehicle and a docking station,
   wherein the aerial vehicle comprises:
      a plurality of propulsion motors, wherein each of the plurality of propulsion motors is coupled to a propeller and configured to rotate the propeller at one or more selected speeds;
      an extension provided on an underside of the aerial vehicle, wherein the extension has a shape of a rectangular solid having a height and a cross-sectional area;
      a first charging contact provided on the underside of the aerial vehicle;
      a plurality of landing legs extending below the underside of the aerial vehicle; and
      one or more computer processors,
   wherein the docking station comprises:
      a frame defining a depression for accommodating the aerial vehicle, wherein the frame comprises a plurality of markings arranged in an asymmetric pattern on at least one surface within the frame;
      a second charging contact provided on the at least one surface within the frame;
      a sensor trigger comprising an insertable element, a spring, a switch and a photointerrupter module in communication with the switch, and
      a power source,
         wherein the power source is configured to energize the second charging contact by way of the switch,
         wherein the spring is aligned to bias an upper platform of the insertable element into contact with the at least one surface within the frame,
         wherein the photointerrupter module comprises a transmitting element aligned to transmit light across a slot and a receiving element aligned to receive light transmitted by the transmitting element across the slot,
  wherein the sensor trigger is in a first state when a lower portion of the insertable element is aligned above the slot and the receiving element receives light transmitted by the transmitting element,
  wherein the sensor trigger is in a second state when the lower portion of the insertable element is inserted into the slot and the receiving element does not receive light transmitted by the transmitting element,
  wherein the photointerrupter module is configured to generate a first signal for opening the switch when the sensor trigger is in the first state, and
  wherein the photointerrupter module is configured to generate a second signal for closing the switch when the sensor trigger is in the second state.

2. The system of claim 1, wherein the extension is provided in a first eccentric location on the underside of the aerial vehicle, and
  wherein the extension is aligned parallel to a pitch axis of the aerial vehicle and perpendicular to a roll axis of the aerial vehicle.

3. The system of claim 2, wherein the upper platform of the insertable element is provided in a second eccentric location on the at least one surface within the frame, and
  wherein the extension is aligned to contact the upper platform of the insertable element and the second charging contact is aligned to contact the first charging contact when the aerial vehicle is docked within the docking station.

4. The system of claim 1, wherein the docking station comprises a housing having a flat base and walls extending normal to the base,
  wherein the walls define an upper rim of the housing,
  wherein the frame has an edge with a size and a shape corresponding to the upper rim of the housing,
  wherein the at least one surface of the frame comprises a bottom section, and angled edge sections descending from the edge to the bottom section,
  wherein the bottom section has a substantially square shape, and
  wherein the frame further comprises a plurality of slit openings on each of the angled edge sections.

5. The system of claim 1, wherein each of the plurality of markings is one of a light-emitting diode, a reflector, a symbol or a character arranged in the asymmetric pattern on the at least one surface of the frame.

6. A system comprising:
  a docking station comprising:
    a first charging contact disposed on an upper side of the docking station;
    a movable member transitionable between:
      a first position in which a first end of the movable member is received within a first opening defined in a first surface disposed on the upper side of the docking station, and
      a second position in which the movable member is disposed further away from the upper side than the first position;
    a spring biasing the movable member towards the first position; and
    a sensor disposed proximate the movable member,
  wherein the first charging contact is not energized when the movable member is in the first position, and
  wherein the first charging contact is energized when the movable member is in the second position.

7. The system of claim 6, wherein the docking station further comprises a plurality of inset portions arranged on the upper side of the docking station, and
  wherein the plurality of inset portions are sized, dimensioned, and positioned to receive a plurality of landing feet of an unmanned aerial vehicle.

8. The system of claim 6, wherein the system further comprises an unmanned aerial vehicle including a plurality of landing feet,
  wherein the docking station further comprises a plurality of inset portions arranged on the upper side of the docking station, and
  wherein the plurality of inset portions are sized, dimensioned, and positioned to receive the plurality of landing feet of the unmanned aerial vehicle.

9. The system of claim 6, wherein the docking station comprises a switch,
  wherein the first charging contact is not energized when the switch is open, and
  wherein the first charging contact is energized when the switch is closed.

10. The system of claim 6, wherein the sensor is configured to detect a position of at least a portion of the movable member.

11. The system of claim 6, wherein the docking station comprises circuitry configured to energize the first charging contact when the movable member is in the second position based on a signal generated by the sensor.

12. The system of claim 6, wherein the sensor comprises a photointerrupter.

13. The system of claim 6, wherein the docking station comprises one or more computer processors and one or more computer readable media having processor-executable instructions stored thereon which, when executed using the one or more processors, cause the docking station to perform operations comprising:
  causing the first charging contact to be energized based at least in part on sensor data generated by the sensor.

14. The system of claim 6, wherein the docking station comprises one or more computer processors and one or more computer readable media having processor-executable instructions stored thereon which, when executed using the one or more processors, cause the docking station to perform operations comprising:
  causing the first charging contact to not be energized based at least in part on sensor data generated by the sensor.

15. The system of claim 6, wherein the movable member comprises an extension arm extending away from the first end.

16. A docking station comprising:
  a housing having a flat base and walls extending normal to the base, wherein the walls define an upper rim of the housing;
  a frame disposed within the housing;
    wherein the frame defines a depression having an edge with a size and a shape corresponding to the upper rim of the housing, a bottom section, and angled edge sections descending from the edge to the bottom section,
    wherein the bottom section has a substantially square shape, wherein a plurality of receptacles are provided in a discrete arrangement at edges of the bottom section on an upper platform of the frame within the depression, wherein a plurality of markings are arranged in an asymmetrical pattern on the upper platform of the frame within the depression, and wherein the frame further comprises a plurality of slit openings on each of the angled edge sections; and a first charging contact provided in a first eccentric location on the bottom section;

a sensor trigger comprising an insertable element having an upper portion and a lower portion, wherein the upper portion of the insertable element is provided in a second eccentric location on the bottom section, and wherein the upper portion of the insertable element is biased into contact with the bottom section of the frame at the second eccentric location, and a switch, wherein the switch is configured to energize the first charging contact when the upper portion of the insertable element is inserted into the frame by at least a predetermined distance.

17. The docking station of claim 16, wherein the sensor trigger further comprises a photointerrupter module provided beneath the insertable element, wherein the photointerrupter module comprises a slot, a transmitting element aligned to transmit light across the slot and a receiving element aligned to receive light transmitted by the transmitting element, wherein the lower portion of the insertable element is aligned for insertion into the slot, and wherein the photointerrupter module is configured to generate a first signal for opening the switch when the receiving element receives light transmitted by the transmitting element and to generate a second signal for closing the switch when the receiving element does not receive light transmitted by the transmitting element.

18. The docking station of claim 16, wherein the frame and at least the upper portion of the insertable element are formed from a low-friction plastic.

19. The docking station of claim 16, wherein the depression is sized and shaped to accommodate an aerial vehicle comprising an extension provided in a third eccentric location on an underside of the aerial vehicle and a second charging contact in a fourth eccentric location on the underside of the aerial vehicle, and wherein the extension is aligned to contact the upper portion of the insertable element and the second charging contact is aligned to contact the first charging contact when the aerial vehicle is docked within the docking station.

20. The docking station of claim 19, wherein the extension has a shape of a rectangular solid having a height and a cross-sectional area, and wherein the lower portion of the insertable element is inserted into the slot when the upper portion of the insertable element is depressed by a distance corresponding to the height.

\* \* \* \* \*